United States Patent
Zhou et al.

(10) Patent No.: US 12,166,561 B2
(45) Date of Patent: Dec. 10, 2024

(54) TRANSMISSION RECEPTION POINT (TRP)-SPECIFIC BEAM FAILURE DETECTION (BFD) REFERENCE SIGNAL (RS) DETERMINATION

(71) Applicant: QUALCOMM Incorporated, San Diego, CA (US)

(72) Inventors: Yan Zhou, San Diego, CA (US); Tianyang Bai, Somerville, NJ (US); Mostafa Khoshnevisan, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/448,632

(22) Filed: Sep. 23, 2021

(65) Prior Publication Data
US 2022/0103232 A1  Mar. 31, 2022

Related U.S. Application Data

(60) Provisional application No. 63/085,131, filed on Sep. 29, 2020.

(51) Int. Cl.
*H04B 7/08* (2006.01)
*H04B 7/022* (2017.01)
(Continued)

(52) U.S. Cl.
CPC ............ *H04B 7/088* (2013.01); *H04W 24/08* (2013.01); *H04W 72/046* (2013.01);
(Continued)

(58) Field of Classification Search
CPC ...... H04B 7/088; H04B 7/0695; H04B 7/022; H04W 24/08; H04W 72/046;
(Continued)

(56) References Cited

U.S. PATENT DOCUMENTS

2016/0150435 A1* 5/2016 Baek ............... H04W 24/10
370/252
2019/0045490 A1* 2/2019 Davydov ............. H04L 5/0044
(Continued)

FOREIGN PATENT DOCUMENTS

EP          3855661 A1      7/2021
WO     2020012619 A1      1/2020
(Continued)

OTHER PUBLICATIONS

Apple Inc: "Remaining Issues on Multi-Beam Operation", 3GPP Draft, R1-1912824, 3GPP TSG-RAN WG1 #99, 3rd Generation Partnership Project (3GPP), Mobile Competence Centre, 650 Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823624, 14 Pages, Retrieved from the Internet: URL: https://ftp.3gpp.org/tsg_ran/WG1_RL1/TSGR1_99/Docs/R1-1912824.zip, R1-1912824 Remaining Issues on Multi-Beam Operation.docx [retrieved on Nov. 9, 2019] Section 1, Section 3, pp. 1-6, 1 Introduction pp. 6-10, 2 Overhead and LatencyReduction p. 13, 4.3 Clarification of Measurement Restriction, p. 9, line 17-line 28, figures 2-3, Section 3.1.
(Continued)

*Primary Examiner* — Harry H Kim
(74) *Attorney, Agent, or Firm* — Dalei Dong; Haynes and Boone, LLP

(57) ABSTRACT

In accordance with some aspects, a method of wireless communication performed by a user equipment (UE) is disclosed. The method includes monitoring for beam failure detection (BFD) reference signals (RSs) for a group of beams of a serving cell, the group of beams associated with a group beam identifier; measuring, based on the monitoring for the BFD RSs, a reference signal received power (RSRP) of one or more of the BFD RSs; and triggering, based on the
(Continued)

RSRP being below a threshold, a beam failure recovery (BFR) process for the group of beams.

29 Claims, 17 Drawing Sheets

(51) Int. Cl.
| | |
|---|---|
| H04B 7/06 | (2006.01) |
| H04L 5/00 | (2006.01) |
| H04W 24/08 | (2009.01) |
| H04W 72/044 | (2023.01) |
| H04W 72/23 | (2023.01) |
| H04W 76/19 | (2018.01) |
| H04W 80/02 | (2009.01) |

(52) U.S. Cl.
CPC ......... *H04W 72/23* (2023.01); *H04W 76/19* (2018.02); *H04W 80/02* (2013.01)

(58) Field of Classification Search
CPC ..... H04W 72/23; H04W 76/19; H04W 80/02; H04L 5/001; H04L 5/0023; H04L 5/0048; H04L 5/0053; H04L 5/0091
See application file for complete search history.

(56) References Cited

U.S. PATENT DOCUMENTS

| | | | |
|---|---|---|---|
| 2019/0281660 A1* | 9/2019 | Cui | H04W 88/06 |
| 2020/0328796 A1* | 10/2020 | Turtinen | H04B 7/0695 |
| 2021/0050901 A1* | 2/2021 | Chin | H04W 72/56 |
| 2021/0282168 A1 | 9/2021 | Matsumura et al. | |
| 2022/0046458 A1* | 2/2022 | Zhu | H04L 5/0048 |
| 2022/0104038 A1* | 3/2022 | Zhou | H04W 74/004 |
| 2022/0109547 A1* | 4/2022 | Svedman | H04L 5/0098 |
| 2022/0173788 A1* | 6/2022 | Kang | H04L 1/1864 |
| 2022/0295589 A1* | 9/2022 | Tsai | H04B 17/309 |
| 2022/0377586 A1* | 11/2022 | Yang | H04B 7/0695 |
| 2022/0394535 A1* | 12/2022 | Li | H04L 27/0006 |
| 2023/0041095 A1* | 2/2023 | Zhou | H04L 5/0057 |

FOREIGN PATENT DOCUMENTS

| | | |
|---|---|---|
| WO | 2020048443 A1 | 3/2020 |
| WO | 2020057665 A1 | 3/2020 |

OTHER PUBLICATIONS

International Search Report and Written Opinion—PCT/US2021/052041—ISA/EPO—Jan. 24, 2022.

* cited by examiner

810

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |

...

| $C_N$ | TCI state $ID_{N,1}$ | Oct M-1 |
|---|---|---|
| R | TCI state $ID_{N,2}$ | Oct M (Optional) |

FIG. 8B

TRANSMISSION RECEPTION POINT (TRP)-SPECIFIC BEAM FAILURE DETECTION (BFD) REFERENCE SIGNAL (RS) DETERMINATION

CROSS-REFERENCE TO RELATED APPLICATIONS

The present application claims priority to and the benefit of the U.S. Provisional Patent Application No. 63/085,131, filed Sep. 29, 2020, titled "Transmission Reception Point (TRP)-Specific Beam Failure Detection (BFD) Reference Signal (RS) Determination," which is hereby incorporated by reference in its entirety as if fully set forth below and for all applicable purposes.

TECHNICAL FIELD

This application relates to wireless communication systems, and more particularly to beam a transmit receive point (TRP) beam failure detection (BFD) reference signal (RS) determination.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some wireless communications systems, a UE and a base station may communicate over a communication link using a directional beam. Changes in the radio environment between the UE and the base station may degrade the quality of the beam used by the UE and the base station, which may result in communication failures between the UE and the base station. The UE may attempt to perform a beam failure recovery (BFR) procedure to re-establish connection with the base station. Additionally, in some wireless communications systems a UE may be in communication with more than one transmission-reception point (TRP) (e.g., in a multi-TRP configuration). Each of the more than one TRP may transmit downlink transmissions to the UE according to a beam configuration and the UE may decode the downlink transmissions from each of the more than one TRPs according to the beam configurations. Efficient BFR procedures in multi-TRP configurations may help enhance multi-TRP communications Consequently, methods of beam failure detection (BFD) and BFR procedures are of importance.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with some aspects of the present disclosure, a method of wireless communication performed by a user equipment (UE) is disclosed. The method includes monitoring for beam failure detection (BFD) reference signals (RSs) for a group of beams of a serving cell, the group of beams associated with a group beam identifier; measuring, based on the monitoring for the BFD RSs, a reference signal received power (RSRP) of one or more of the BFD RSs; and triggering, based on the RSRP being below a threshold, a beam failure recovery (BFR) process for the group of beams.

A user equipment (UE) according to some aspects includes a memory; and a processor coupled to the memory and configured to: monitor for beam failure detection (BFD) reference signals (RSs) for a group of beams of a serving cell, the group of beams associated with a group beam identifier; measure, based on the monitoring for the BFD RSs, a reference signal received power (RSRP) of one or more of the BFD RSs; and trigger, based on the RSRP being below a threshold, a beam failure recovery (BFR) process for the group of beams.

Some aspects of the present disclosure disclose a method of wireless communication performed by a base station (BS). The method comprises transmitting to a user equipment (UE) at least one DCI communications with an indication of beam failure detection (BFD) reference signals (RSs) for a group of beams of a serving cell. Further, the BS may transmit the BFD RSs to the UE. In some aspects, the BS may receive from the UE a beam failure recovery (BFR) message.

In some aspects, a BS may comprise a memory; and a transceiver coupled to the memory and configured to transmit to a user equipment (UE) at least one DCI communications with an indication of beam failure detection (BFD) reference signals (RSs) for a group of beams of a serving cell. Further, the transceiver is configured to transmit the BFD RSs to the UE. In addition, the transceiver may receive from the UE a beam failure recovery (BFR) message.

In accordance with some aspects, a method of operating a base station (BS) includes configuring a user equipment (UE) with configuration information sufficient to determine beam failure detection (BFD) reference signals (RSs); providing enablement of the UE for determining of the BFD RSs; and operating to perform beam failure recovery (BFR).

A base station (BS) according to some aspects includes a memory; and a processor coupled to the memory and configured to configure a user equipment (UE) with configuration information sufficient to determine beam failure detection (BFD) reference signals (RSs) for a group of beams of a serving cell; provide enablement of the UE for determining of the BFD RSs; and operate to perform beam failure recovery (BFR).

Other aspects, features, and embodiments of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method embodiments it should be understood that such exemplary aspects can be implemented in various devices, systems, and methods.

BRIEF DESCRIPTION OF THE DRAWINGS

FIGS. 8A and 8B illustrate another example of a BFD RS determination according to some aspects of the present disclosure.

DETAILED DESCRIPTION

Figure 1:
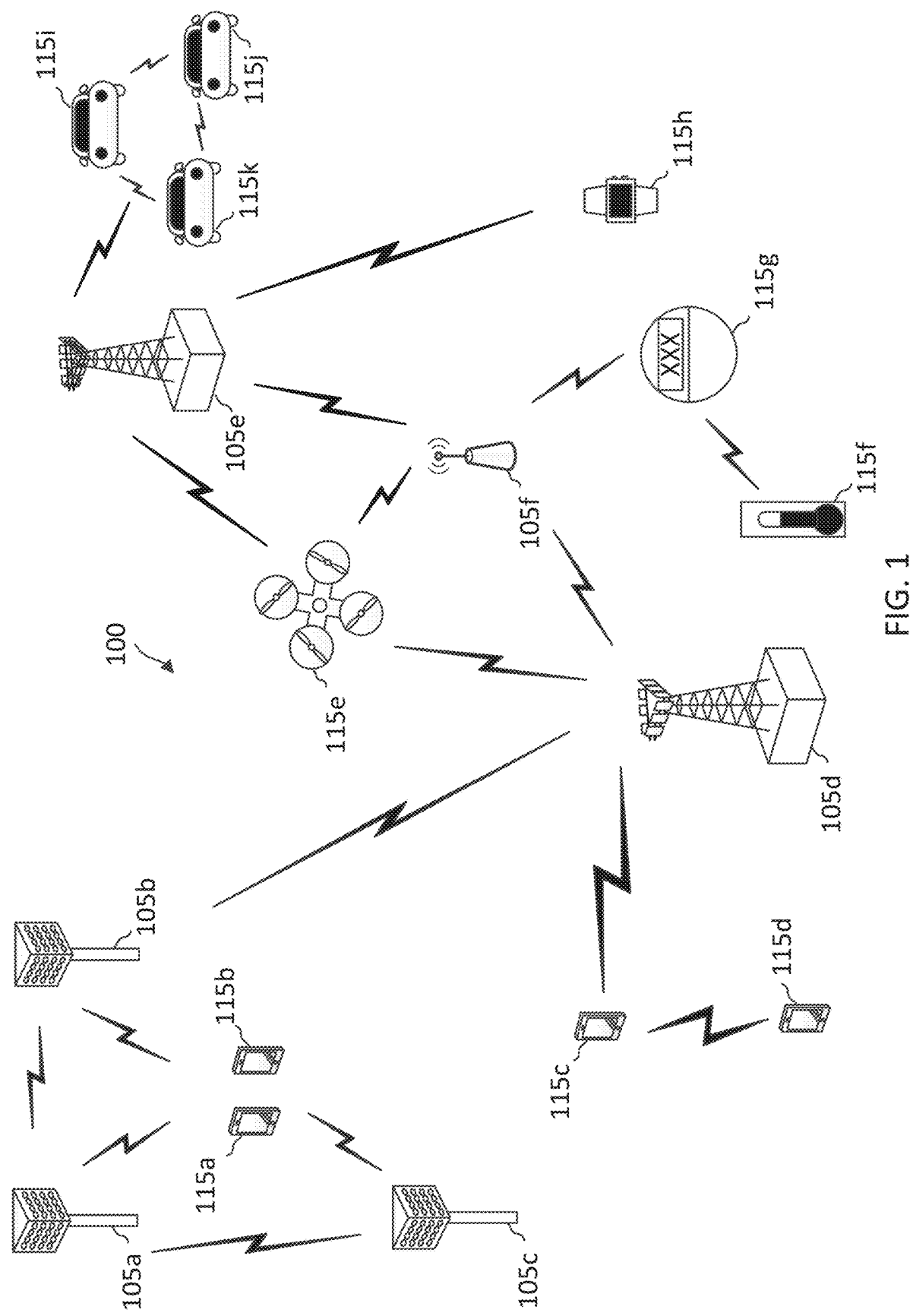
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some wireless communications systems, a user equipment (UE) may support communications with multiple beam groups, wherein each of the multiple beam groups may be a transmission-reception points (TRPs). For example, the UE may receive downlink transmissions (e.g., via a physical downlink shared channel (PDSCH)) from multiple TRPs. Additionally, the UE may decode each of the downlink transmissions according to a beam configuration associated with the downlink transmission. Further, such multi beam group communications may be primary cell (Pcell) communications, secondary cell (Scell) communications, or both. In some cases, one or more beams from a particular beam group may degrade to a point where effective communication via the beam is unlikely. Thus, beam failure detection (BFD) and beam failure recovery (BFR) in such cases may be beneficial to help communications. In cases where multiple beam groups are used for communications, techniques such as discussed herein may be used to identify beam failure, select candidate beams for use in subsequent communications, and communicate information related to such beams for service cells.

In some cases, a UE may establish a connection with a Pcell and a Scell, where the Scell, and in some cases the Pcell, uses beamformed communications via two or more beam groups (e.g., transmission-reception points (TRPs)). In some cases, the different beam groups may be associated with different control resource set (CORESET) pool index values, and one or more Scell component carriers (CCs) may be configured with multiple CORESET pool index values. Thus, from the perspective of the UE, different TRPs are transparent, and the UE can identify different CORESET pool index values associated with received signals.

In some cases, the UE may perform BFD procedures that may identify one or more beams associated with a particular CORESET pool index value that have a degraded channel quality. The BFD procedures monitor beams associated with BFD reference signals (RSs). In some cases, reference signals transmitted via each of the TRPs (e.g., for BFD or for candidate beam detection (CBD)) may provide an indication of a corresponding CORESET pool index (e.g., based on a reference signal sequence), which may be detected at the UE. In some cases, the UE may determine to declare a beam failure for one or more beams, and may beam failure recovery (BFR) process in response. Identification of the BFD RSs used in the BFD/BFR process for the group of beams is the subject of this disclosure.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, hybrid TDM-FDM techniques, or spatial division multiplexing (SDM). A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2

(MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARM) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2A:
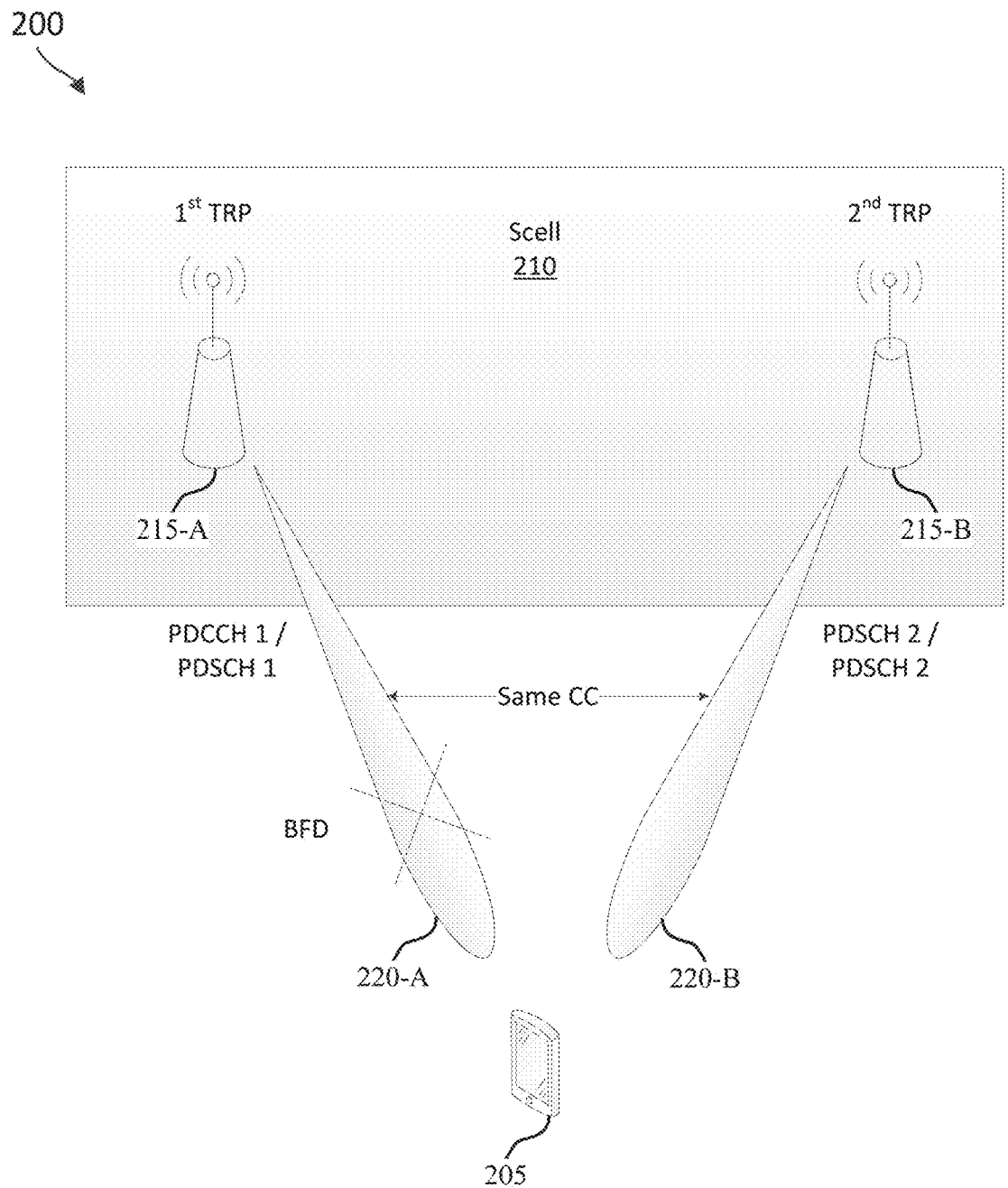
FIG. 2A illustrates an example of a portion of a wireless communication system that supports beam failure recovery techniques for multiple transmission-reception points (TRPs) in a primary or secondary cell according to some aspects of the present disclosure.

FIG. 2A illustrates an example of a wireless communications system 200 that supports beam failure recovery techniques for multiple transmission-reception points (TRPs) in secondary cell in accordance with aspects of the present disclosure. As discussed above, the multiple TRPs illustrated in FIG. 2A is an example of multiple beam groups. In some examples, wireless communications system 200 may implement aspects of wireless communications system 100. Wireless communications system 200 may include a UE 205 and in communications with a number of TRPs 215, which may be examples of the corresponding devices described herein. TRPs 215 may, in this example, provide a multi-TRP Scell, for example, in which a first beam 220-*a* of a first TRP 215-*a* and a second beam 220-*b* of a second TRP 215-*b* provide communications with the UE 205.

In some cases, the multi-TRP transmissions, including configuration associated with determining BFD RSs, may be configured based on multiple downlink control information n(DCI) communications, in which a first DCI (e.g., transmitted in PDCCH1 from first TRP 215-*a*) schedules a downlink shared channel transmission (e.g., PDSCH1 transmitted from first TRP 215-*a* via first beam 220-*a*), and a second DCI (e.g., transmitted in PDCCH2 from second TRP 215-*b*) schedules a second downlink shared channel transmission (e.g., PDSCH2 transmitted from second TRP 215-*b* via second beam 220-*b*). TRP 215 differentiation at the UE 205, in some cases, may be based on a value of a CORESET pool index (e.g., CORESETPoolIndex), where each CORESET (e.g., up to a maximum of five CORESETs) can be configured with a value of CORESET pool index. In some cases, the value of CORESET pool index can be zero or one, which groups the CORESETs in to two groups that may correspond to the different TRPs 215. Only some CCs may be configured with two values of CORESET pool index, while other CCs may not be configured with two values of CORESET pool index and thus BFD/BFR for on a per-TRP 215 basis may be provided for CCs that are configured with two values of CORESET pool index. In some cases, a configuration may be based on a single DCI communication, in which the configuration data for all of the multiple TRPs in the multi-TRP transmission is included in the single PDCCH transmission.

In some cases, the UE 205 may be configured to provide per-TRP 215 BFR, which enables separate BFD and separate CBD for the beams corresponding to a TRP 215 in a CC that is configured with two values of CORESET pool index. In the absence of per-TRP 215 BFR, beam failure detection and beam candidate determination is not triggered until all beams in that CC become weak. With per-TRP 215 BFR, when beams for a given TRP become weak, recovery procedures can be done and best beam corresponding to that TRP 215 can be identified without having to wait for the beams of the other TRP 215 to also become weak, and thus reliability and communications efficiency can be enhanced. In the example, of FIG. 2A, Scell 210 may be configured with two values of CORESET pool index, with one value associated with the first TRP 215-a and a second value associated with second TRP 215-b. In this case, each TRP 215 may transmit one or more BFD reference signals that may be monitored by the UE 205. In this example, the UE 205 may determine that the first beam 220-a of the first CORESET pool index value has a channel metric (e.g., a reference signal received power RSRP)) that is below a threshold value (e.g., when radio link quality is worse than a threshold $Q_{out}$ for reference signals in BFD reference signal that are associated with CORESET pool index value) for a period of time. Various examples of beam failure declaration, candidate beam detection, and beam recovery are discussed further below.

Figure 2B:
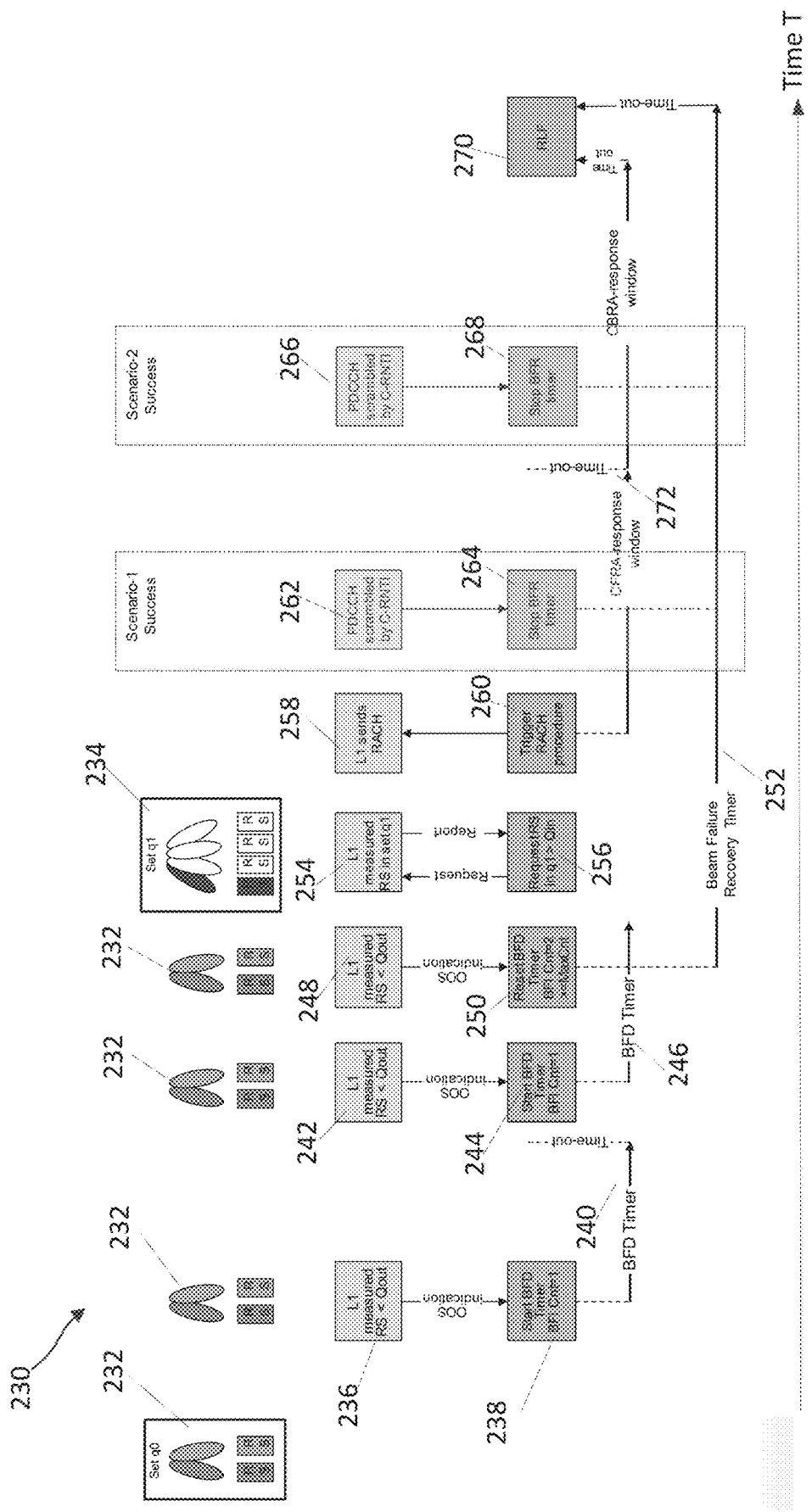
FIG. 2B illustrates aspects of beam failure recovery according to some aspects of the present disclosure.

FIG. 2B illustrates an example sequence 230 that illustrates beam failure detection (BFD) and beam failure recover (BFR) in a system such as that illustrated in FIG. 2A. As illustrated in FIG. 2B, TRP set q0 232 is providing communications. As illustrated, set q0 includes two TRP reference signals (RS), indicating two communicating beams. The two TRP RSs may be BFD RSs as discussed further below. In step 236, the level of one or more of the TRP resources in set 232 is measured and determined to be below a threshold value Qout, resulting in provision of an out-of-sync (OOS) indication. In step 238, in response to the OOS indication, a beam failure detector (BFD) timer is started and a beam failure index (BFI) count is set to 1. However, as indicated in FIG. 2B, BFD timer 240 times out prior to receipt of another OOS indication.

In step 242 the level of one or more of the TRP resources in set 232 is measured and determined to be below a configurable threshold value Qout resulting in provision of an OOS indication. As before, in step 244 a BFD timer 246 is started and a BFI counter initiated. As is illustrated in FIG. 2B in step 248, one or more of the TRP resources in set 232 is again measured and determined to be below a threshold value Qout resulting in provision of another OOS indication that occurs within BFD timer 246. In step 250, the BFI counter is incremented until the BFI counter is at a MaxCnt value. In this particular example, MaxCnt is set to 2, however MaxCnt can be configurably set to any integer such that if the TRP resources result in OOS indication for set period of time.

In step 250, with BFI counter at the MaxCnt value, a BFR timer 252 is started. In step 254, a reference signal received power (RSRP) corresponding to the TRP RS q1 234 is measured to have a value greater than the threshold. In step 256, a report is received from step 254 and a request for the TRP resource in set 234 is presented. In step 260, a random access procedure on a Random Access Channel (RACH) can be triggered and in step 258 the RACH request can be sent, for example to a primary cell (PCell) receiver of the request. Transmission of the RACH message can trigger a response window 272. Within the first timing window, a PDCCH 262 can be received that stops the BFR timer 264 within the time-out period of the response window 272 or a PDCCH 266 that stops BFR 268 after the response window time out but before the BFR timer 252 timeout will result in adaption of the TRP resource from set q1 234. However, if step 270 is reached, the BFR times out and results in overall failure to recover in step 270.

Figure 3A:
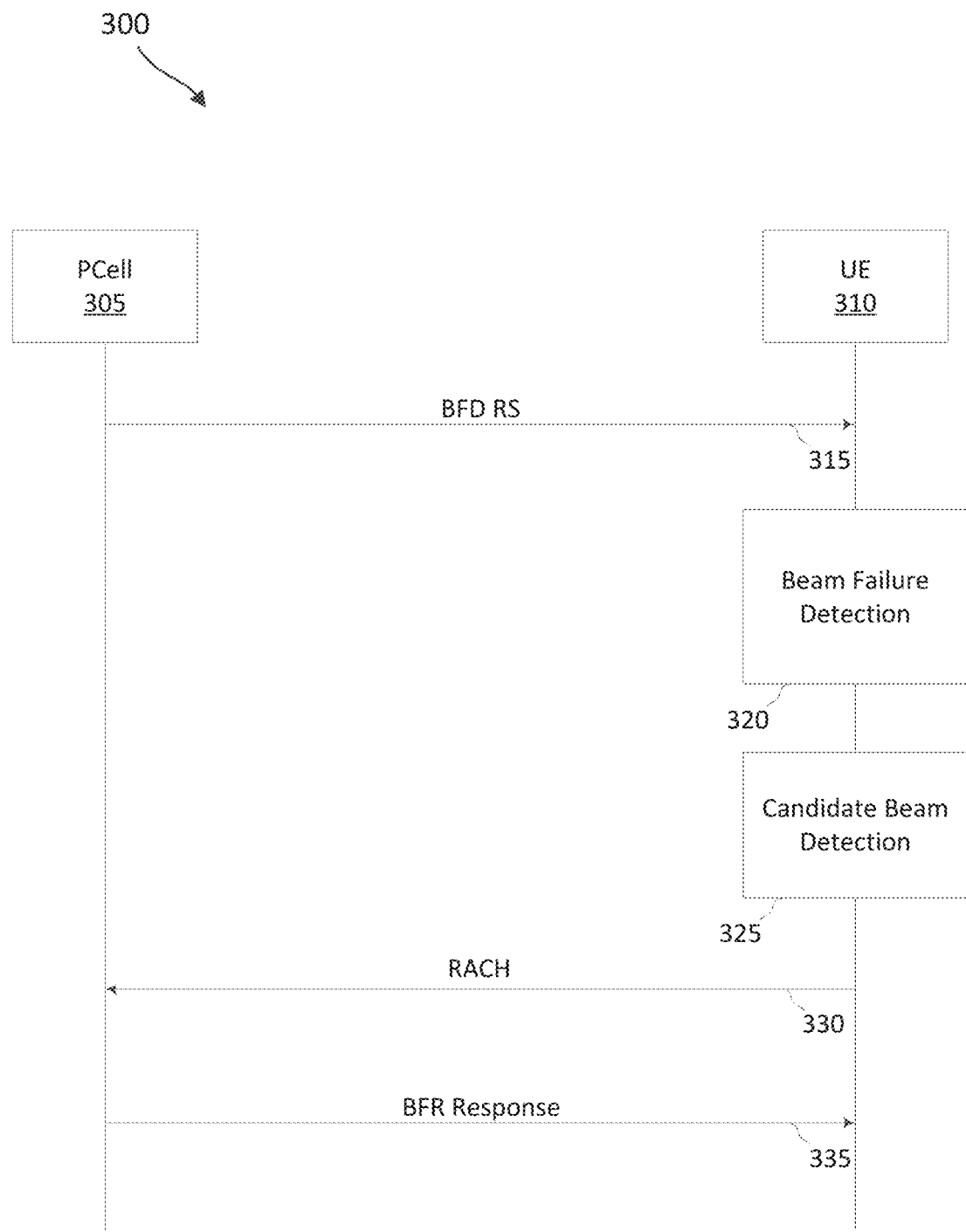
FIG. 3A illustrates an example of a process flow that supports beam failure recover techniques for multiple transmission-reception points according with some aspects of the present disclosure.

FIG. 3A illustrates an example of a process flow 300 that supports beam failure recovery techniques for multiple beam groups in a secondary cell in accordance with aspects of the present disclosure. In some examples, process flow 300 may implement aspects of wireless communications system 100 or 200 and further illustrates the process flow 200 as illustrated in FIG. 2B. Process flow 300 may be implemented by a UE 310 and a PCell 305 that has two values of CORESET pool index values (and is served by multiple different beam groups) as described herein. In the following description of the process flow 300, the communications between the UE 310 and the Pcell 305 may be transmitted in a different order than the example order shown, or the operations performed by the UE 310 and Pcell 305 may be performed in different orders or at different times. Some operations may also be omitted from the process flow 300, and other operations may be added to the process flow 300.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At message 315, the Pcell 305 may transmit, and UE 310 may receive, configuration information that includes one or more BFD reference signals of a set of BFD reference signals. The UE 310 may measure one or more channel metrics of the BFD reference signals as part of a BFD process. In accordance with various aspects, the BFD reference signals may be transmitted by different beam groups, and have multiple CORESET pool index values, and the BFD reference signals have an indication of the associated CORESET pool index value (e.g., zero or one, based on a reference signal sequence that is configured to a CORESET pool index value).

At step 320, the UE 310 may determine that a BFD is detected, which has been discussed above in FIG. 2B. In some cases, the detection of the BFD may be based on a channel metric of the reference signal being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. In the BFD reference signals are not configured, the reference signal sets indicated by the active TCI states of CORESETs monitored by the UE 310 may be used. If, for an active TCI state of a CORESET, there are 2 reference signal indices, the one with QCL-TypeD is preferentially used. The physical layer in the UE 310 may assess the radio link quality according to the BFD set against the threshold value (e.g., $Q_{out}$). If radio link quality is worse than $Q_{out}$ for all the reference signals in the BFD resource set, the UE 310 may declare a beam failure.

At step 325, the UE 310 may perform candidate beam detection (CBD). In some cases, CBD may be based on periodic CSI-RS/SSB that are configured by RRC (e.g., configured by RRC parameter candidateBeamRSList). In some cases, up to 16 resources with the corresponding random access preamble index (e.g., ra-preamble-index) may be configured. The UE 310 may provide reference signal indices and the RSRP among the list that have equal or larger RSRP value than a threshold value (e.g., $Q_{in}$), which may be a configurable threshold.

At communications 330, the UE 310 may transmit, for example a RACH request, to the Pcell 305. In some cases, the UE 310 may initiate random access procedures (e.g., contention-free random access) based on the random access resource (e.g., ra-preamble-index) associated with a selected reference signal index with RSRP above the threshold (e.g., RS index q_new).

At communications 335, the Pcell 305 may transmit, and the UE 310 may receive, a BFR response. In some cases, the UE 310 may monitor PDCCH in a search space set provided by a RRC parameter (e.g., recovery SearchSpaceId) for detection of a DCI format with CRC scrambled by C-RNTI or MCS-C-RNTI starting from slot n+4. If the UE 310 receives the PDCCH within this window, BFR is completed. Following the BFR response, the UE 310 may use quasi co-located (QCL) RS assumptions that the same QCL parameters as associated with reference signal index q_new until the UE 310 receives an activation for a TCI state. In some cases, after a set of symbols (e.g., 28 symbols) from a last symbol of a first PDCCH reception where the UE 310 detects a DCI format with CRC scrambled by C-RNTI or MCS-C-RNTI, the UE 310 assumes the same QCL parameters as the ones associated with RS index q_new for PDCCH monitoring in a CORESET with index 0.

In some cases, Pcell 310 may be configured with multiple beam groups (e.g., TRPs), and the CORESET pool index may be configured with two values. In some cases, separate RACH resources may be configured for different CORESET pool index values, which may allow the UE 310 to indicate beam failure associated with a particular CORESET pool index value, which may be associated with a particular TRP. As discussed herein, in some cases one or more Scells may be configured with two values of CORESET pool index, and a UE may perform a BFD procedure for the Scell, an example of which is discussed with reference to FIG. 3B.

Figure 3B:
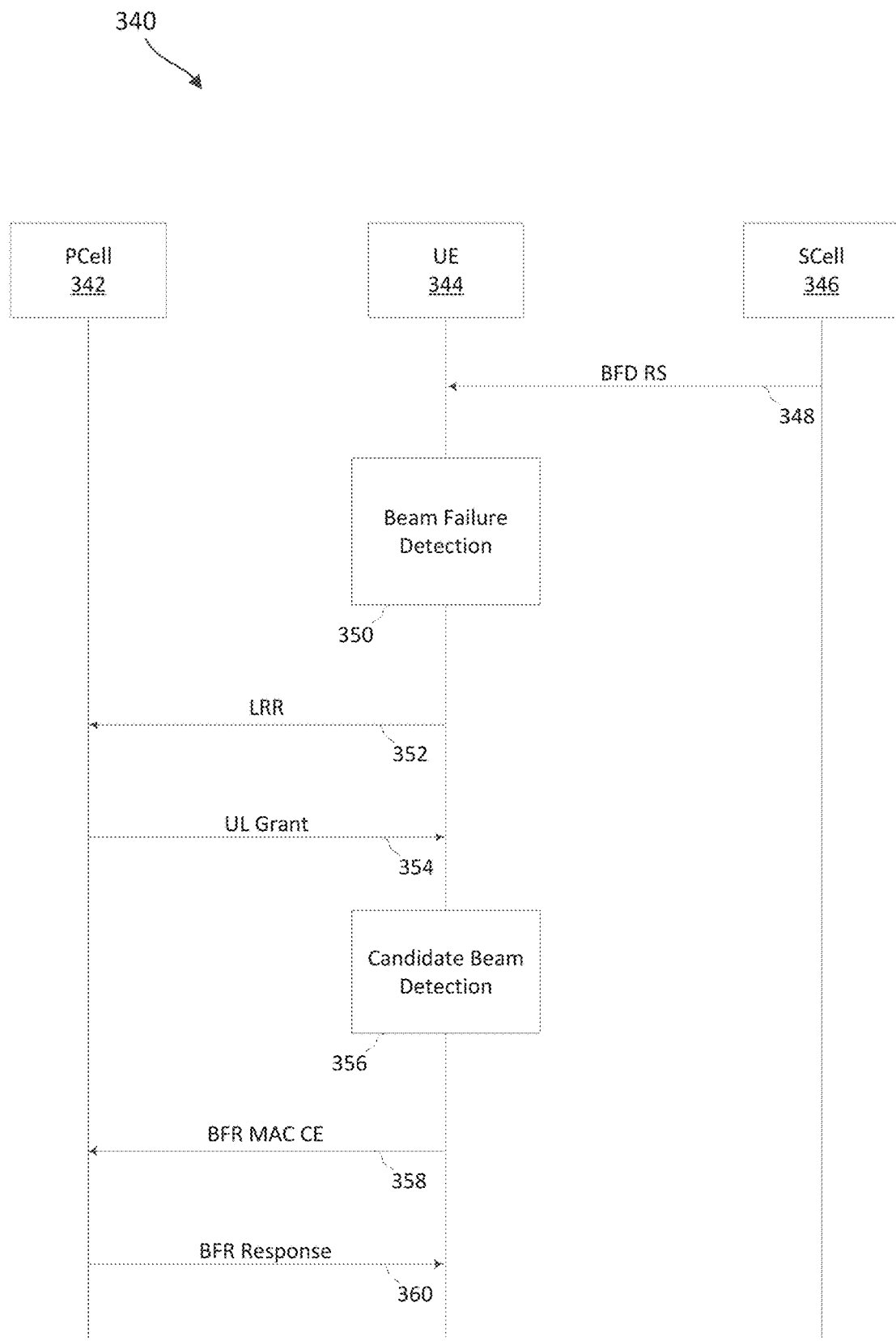
FIG. 3B illustrates an example of a process flow that supports beam failure recovery techniques for multiple transmission-reception points in accordance with some aspects of the present disclosure.

FIG. 3B illustrates another example of a process flow 340 that supports beam failure recovery techniques for multiple transmission-reception points in a secondary cell in accordance with aspects of the present disclosure and as discussed with respect to FIG. 2B above. In some examples, process flow 340 may implement aspects of wireless communications system 100 or 200. Process flow 340 may be implemented by a UE 344 and a PCell 342 and a Scell 346, where the Scell 346 may have two values of CORESET pool index values (and is served by multiple different TRPs) as described herein. In the following description of the process flow 340, the communications between the UE 344, the Pcell 342, and the Scell 346 may be transmitted in a different order than the example order shown, or the operations performed by the UE 344, Pcell 342, and Scell 346 may be performed in different orders or at different times. Some operations may also be omitted from the process flow 340, and other operations may be added to the process flow 340.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At a high level, the UE 344 may monitor for BFD RS(s) from the Scell 346, report a BFD of the Scell 346 to the Pcell 342, and perform a BFR (via a RACH procedure) for the Scell 346 via the Pcell 342.

At communications 348, the Scell 346 may transmit, and UE 344 may receive, one or more BFD reference signals of a set of BFD reference signals in a configuration process. The UE 344 may measure one or more channel metrics of the BFD reference signals as part of a BFD process. In accordance with various aspects, the BFD reference signals may be transmitted by different TRPs, and have multiple CORESET pool index values, and the BFD reference signals have an indication of the associated CORESET pool index value (e.g., zero or one, based on a reference signal sequence that is configured to a CORESET pool index value).

At step 350, the UE 344 may determine that a BFD is detected at the Scell 346. In some cases, similarly as discussed with reference to FIGS. 2B and 3A above, the detection of the BFD may be based on a channel metric of the reference signal (the BFD RS(s) received at communication 348) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 344 may be used. If, for an active TCI state of a CORESET, there are 2 reference signal indices, the one with QCL-TypeD is preferentially used. The physical layer in the UE 344 may assess the radio link quality according to the BFD set against the threshold value (e.g., $Q_{out}$). If radio link quality is worse than $Q_{out}$ for all the reference signals in the BFD resource set, the UE 344 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal is considered for both TRPs. In some case, when failure detection resources are not configured, reference signal sets indicated by the active TCI states of CORESETs configured with CORESET pool index zero or one determines the first and second sets of resources, respectively. In some cases, a beam failure for a value of CORESET pool index is declared when radio link quality is worse than the configured threshold value (e.g., $Q_{out}$) for all the reference signals in the BFD resources that are associated with that CORESET pool index value.

At communications 352, the UE 344 may transmit a link recovery request (LRR) or other BFR request on the Pcell 342. In some cases, the recovery request may be transmitted on a Pcell, on a primary Scell (Pscell), or on a Scell that is configured for PUCCH (a PUCCH-Scell) in which PUCCH BFR is configured. The LRR may indicate that the UE 344 is requesting uplink resources (e.g., similar to a scheduling request (SR), and may use PUCCH format 0 or 1. In some cases, two PUCCH resources can be configured for LRR (e.g., indicated by schedulingRequestID-BFR-Scell) by two corresponding scheduling request IDs. The two PUCCH resources or scheduling request IDs may be associated with the two values of CORESET pool index. If BFD is declared for a value of CORESET pool index in Scell 346, in some cases, the PUCCH resource/scheduling request ID that corresponds to the other value of CORESET pool index may be used for LRR transmission. Such a selection of resources provides that if the beams of Scell 346 and a PUCCH-cell are the same, and if all beams for one TRP become weak, LRR is transmitted using a beam corresponding to the other TRP. Such a rule may be applied, for example, when the CC with PUCCH-BFR is in the same band as the Scell 346.

In other cases, the PUCCH resource/scheduling request ID that corresponds to the same value of CORESET pool index is used for LRR transmission. Such a selection may provide that LRR is transmitted to the same TRP for non-ideal backhaul scenario. Such a rule may be followed, for example, when separate feedback is configured for different cells (ACKNACKFeedbackMode=SeparateFeedback). In other cases, the PUCCH resource/scheduling request ID that corresponds to CORESET pool index=0 is used for LRR transmission. Such a rule can be followed, for example, when the CC with PUCCH-BFR is in a different band than the Scell 346. In still other cases, Both PUCCH resources/scheduling request ID's may be used to transmit LRR irrespective of the CORESET pool index for which BFD is declared. This means that multiple instances of the LRR transmission are provided across the two PUCCH resources (and is transmitted to both TRPs).

At communication 354, the Pcell 342 may provide an uplink grant to the UE 344. Such an uplink grant may be a normal uplink grant with C-RNTI/MCS-C-RNTI that can serve as response to LRR, which the UE 344 may use to schedule a PUSCH in which a BFRQ MAC-CE can be transmitted. It is noted that in some cases the UE 344 may have an existing uplink grant, in which cases the LRR and associated uplink grant operations may be skipped.

At step 356, the UE 344 may perform a CBD procedure. Before sending the MAC-CE with the beam failure recovery message, the UE 344 may first identify one or more candidate beams for the failed Scell. The CBD process may be performed in a similar manner as discussed with reference to FIG. 3A and FIG. 2B above, with the exception that the procedure is for Scell 346. In some cases, up to 64 resources (e.g., indicated in RRC in candidateBeamRSSCellList-r16), which can be transmitted on the failed Scell 346 or another CC in the same band. In some cases, each candidate beam is associated with a CORESET pool index value. In one example, two lists of candidate beams may be provided (e.g., two lists for parameter candidateBeamRSSCellList-r16 are configured) each corresponding to a CORESET pool index value. In another example, each reference signal in the list of candidate beams (e.g., in candidateBeamRSSCellList-r16) may be configured with a CORESET pool index value. In some cases, if a reference signal is not configured with a CORESET pool index value, it is assumed to be associated with CORESET pool index value zero. In addition, it can be allowed for a reference signal to be configured with both values of CORESET pool index, in which case it is considered for both TRPs. When BFD is declared for a value of CORESET pool index, a candidate beam may be identified only within reference signals that are associated with the same value of CORESET pool index.

At communication 358, the UE 344 may transmit a beam failure recovery message in a BFR MAC-CE (a BFRQ). Examples of the BFR MAC-CE are discussed further below. The BFR MAC-CE can be transmitted using the resources provided in the uplink grant, and can be sent on any cell, including failed SCell 346, in some instances. In some cases, the UE 344 may indicate the CORESET pool index value in the Scell MAC-CE for the corresponding Scell 346. Such an indication may be provided, in some cases, in accordance with the examples discussed further below.

At communication 360, the Pcell 342 may provide a BFR response to the UE 344. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in an Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Figure 3C:
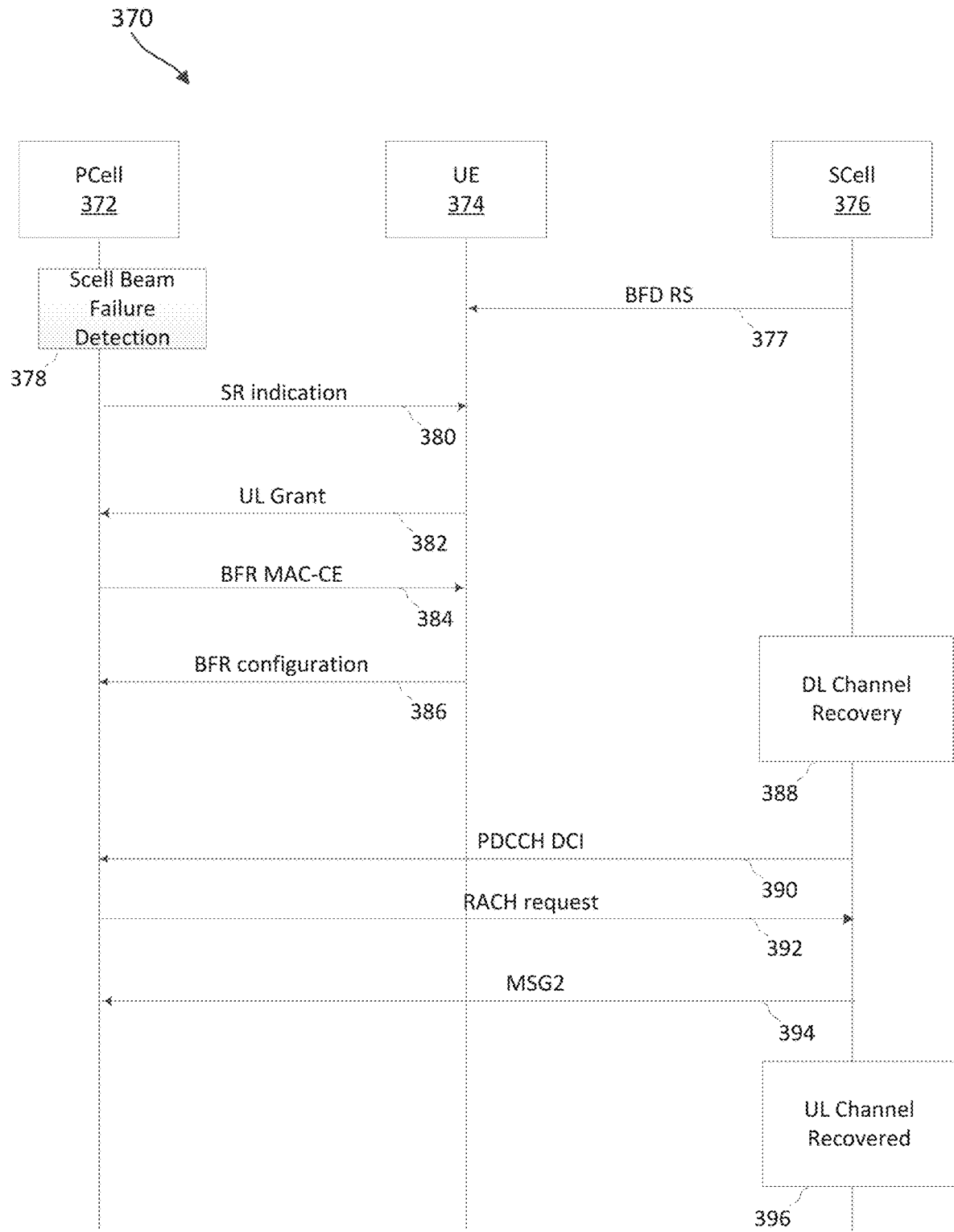
FIG. 3C further illustrates aspects of beam failure recovery according to some aspects of the present disclosure.

Thus, in some cases the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refraining from resetting the beams for the one or more PUCCH resources in response to the CORESET pool index value of the identified candidate beam having a second value (e.g., CORESET pool index=1), when the secondary cell is configured for uplink control information transmissions FIG. 3C illustrates another example process flow 370 for beam failure recovery techniques for multiple beam groups in a secondary cell in accordance with aspects of the present disclosure. In some examples, process flow 370 may implement aspects of wireless communications system 100 or 200. Process flow 370 may be implemented by a UE 372 and a Pcell 374 and a Scell 376, where the Scell 376 may have multiple values of CORESET pool index values (and is served by multiple different TRPs) as described herein. In some aspects, the Pcell 372 may operate over a carrier frequency in a frequency range 1 (FR1), and the Scell 376 may operate over a carrier frequency in a frequency range 2 (FR2). FR1 may refer to sub-6 GHz frequencies (e.g., between about 4 GHz to about 7 GHz), and FR2 may refer to mmWave frequencies (e.g., between about 24 GHz to about 52 GHz). In the following description of the process flow 370, the communications between the UE 372, the Pcell 374, and the Scell 376 may be transmitted in a different order than the example order shown, or the operations performed by the UE 372, Pcell 374, and Scell 376 may be performed in different orders or at different times. Some operations may also be omitted from the process flow 370, and other operations may be added to the process flow 370.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The process flow 370 may be substantially similar to the process flow 340. For instance, the UE 344 may monitor for BFD RS(s) 377 from the Scell 376 and report a BFD of the Scell 376 to the Pcell 374. However, in the process flow 370, the UE 372 may perform a RACH procedure with the Scell 376 instead of the Pcell 374 to complete a BFR for the Scell 376.

At step 378, the UE 372 may determine that a BFD is detected at the Scell 376. In some cases, similarly as discussed with reference to FIGS. 2B, 3A, and 3B above, the detection of the BFD may be based on a channel metric of the reference signal (e.g., BFD RS(s) 377. received from the Scell 376 as discussed above with respect to communication 348 of FIG. 2B) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 374 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 374 may assess the radio link quality according to the BFD set against the threshold value (e.g., $Q_{out}$). If radio link quality is worse than $Q_{out}$ for all the reference signals in the BFD resource set, the UE 374 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal may be considered for both TRPs. In some cases, when failure detection resources are not configured, reference signal sets indicated by the active TCI states of CORESETs configured with CORESET pool index zero or one determines the first and second sets of resources, respectively. In some cases, a beam failure for a value of CORESET pool index may be declared when radio link quality is worse than the configured threshold value (e.g., $Q_{out}$) for all the reference signals in the BFD resources that are associated with that CORESET pool index value.

At communication 380, in response to the detecting the BFD at the Scell 376, the UE 372 transmits an SR indication to the Pcell 374 (over an FR1 frequency carrier of the Pcell 374) via a scheduling request (SR). In some aspects, the UE 372 may transmit the SR over a PUCCH resource, for example, using a PUCCH format 0 or a PUCCH format 1. The SR indication may request the Pcell 374 to provide the UE 372 with PUSCH resources, which may be used by the UE 372 to transmitting a BFRQ for the Scell 376. In other words, the UE 372 may determine to initiate a BFR for the Scell 376 by transmitting the SR indication.

In some aspects, the UE 372 may initiate a BFR for the Scell 376 based on a beam group BFD parameter or a cell-level BFD parameter. The SR indication may indicate that the UE 344 is requesting uplink resources, which the SR indication may be transmitted using a PUCCH resource. In some cases, two PUCCH resources can be configured for requesting BFR for the Scell 376 (e.g., indicated by schedulingRequestID-BFR-Scell) by two corresponding scheduling request IDs. The PUCCH resources or scheduling request IDs may be associated with the values of CORESET pool index. If BFD is declared for a value of CORESET pool index in Scell 376, in some cases, the PUCCH resource/scheduling request ID that corresponds to another value of CORESET pool index may be used for LRR transmission. Such a selection of resources provides that if the beams of Scell 376 and a PUCCH-cell are the same, and if all beams for one TRP become weak, the SR indication (the BFR request for the Scell 376) can be transmitted using a beam corresponding to the other TRP. Such a rule may be applied, for example, when the CC with PUCCH-BFR is in the same band as the Scell 376.

In other cases, the PUCCH resource/scheduling request ID that corresponds to the same value of CORESET pool index is used for the SR indication transmission. Such a selection may provide that the SR indication is transmitted to the same TRP for non-ideal backhaul scenario. Such a rule may be followed, for example, when separate feedback is configured for different cells (ACKNACKFeedbackMode=SeparateFeedback). In other cases, the PUCCH resource/scheduling request ID that corresponds to CORESET pool index=0 is used for SR indication (the BFR request for the Scell 376) transmission. Such a rule can be followed, for example, when the CC with PUCCH-BFR is in a different band than the Scell 376. In still other cases, multiple PUCCH resources/scheduling request IDs may be used to transmit the SR indication irrespective of the CORESET pool index for which BFD is declared. This means that multiple instances of the SR indication transmission are provided across the multiple PUCCH resources (and transmitted to both TRPs).

At communication 382, the Pcell 374 may provide an uplink grant to the UE 372. Such an uplink grant may be a normal uplink grant with C-RNTI/MCS-C-RNTI that can serve as response to the SR indication (the BFR request for the Scell 376), which the UE 372 may use to transmit a PUSCH in which a BFRQ MAC-CE can be transmitted. It is noted that in some cases the UE 344 may have an existing uplink grant, in which cases the LRR and associated uplink grant operations may be skipped.

At communication 384, the UE 372 may transmit a beam failure report indicating a BFD at the Scell 376 in a BFR MAC-CE (a BFRQ). Examples of the BFR MAC-CE are discussed further below. The BFR MAC-CE is transmitted using the resources provided in the uplink grant, and can be sent on any cell, including failed SCell 376. In some cases, the UE 372 may indicate the CORESET pool index value in the Scell MAC-CE for the corresponding Scell 376. In general, the UE 372 may indicate a beam failure and a desired or candidate beam for recovery. Such an indication may be provided, in some cases, in accordance with the examples discussed further below.

At communication 386, the Pcell 374 may provide a BFR configuration to the UE 372 for performing a BFR for the Scell 376. The FR configuration may indicate a new CORESET with a TCI State Activation for Scell 376 in a PUCCH TCI update. In some aspects, the BFR configuration may be based on a beam group BFD parameter or a cell-level BFD parameter. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in the Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is a PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Thus, in some cases the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refrain from resetting the beams for the one or more PUCCH resources in response to the CORESET pool index value of the identified candidate beam having a second value (e.g., CORESET pool index=1), when the secondary cell is configured for uplink control information transmissions.

At step 388, the Scell 376 may perform DL channel recovery and the DL channel recovered.

At communication 390, the Scell 376 may provide the UE 372 with a PDCCH DCI (e.g., transmitted via a FR2 frequency of the Scell 376. The PDCCH DCI may be transmitted based on a C-RNTI of the UE 372. The PDCCH DCI may indicate a resource for the UE 372 to transmit a RACH request (e.g., a RACH preamble or MSG1).

At communication 392, upon receiving the PDCCH DCI, the UE 372 may transmit a RACH request using the resource indicated by the PDCCH DCI received at communication 390.

At communication 394, upon receiving the RACH request, the Scell 376 may respond with MSG2. In some aspects, the MSG2 may indicate a scheduling grant for the UE 372 to transmit a UL communication. At which point, Scell UL channel is recovered at step 396.

The BFD and BFR procedures discussed herein can be executed on UEs and BSs implemented in the networks illustrated in FIG. 1 and FIG. 2A. Consequently, FIG. 4 illustrates an example UE 400 and FIG. 5 illustrates an example BS 500 according to some aspects as discussed herein.

Figure 4:
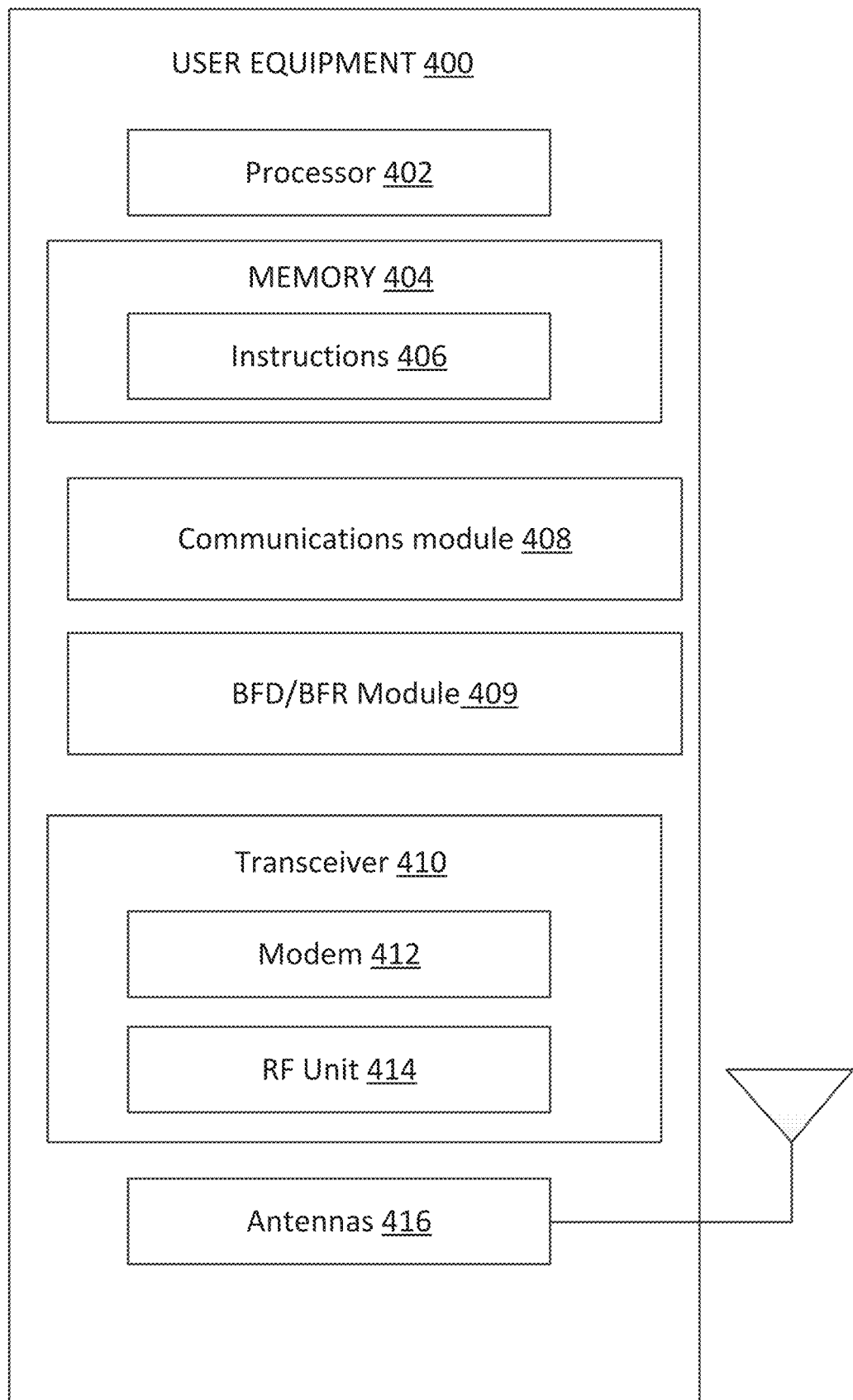
FIG. 4 is a block diagram of a user equipment (UE) according to some aspects of the present disclosure.
Figure 5:
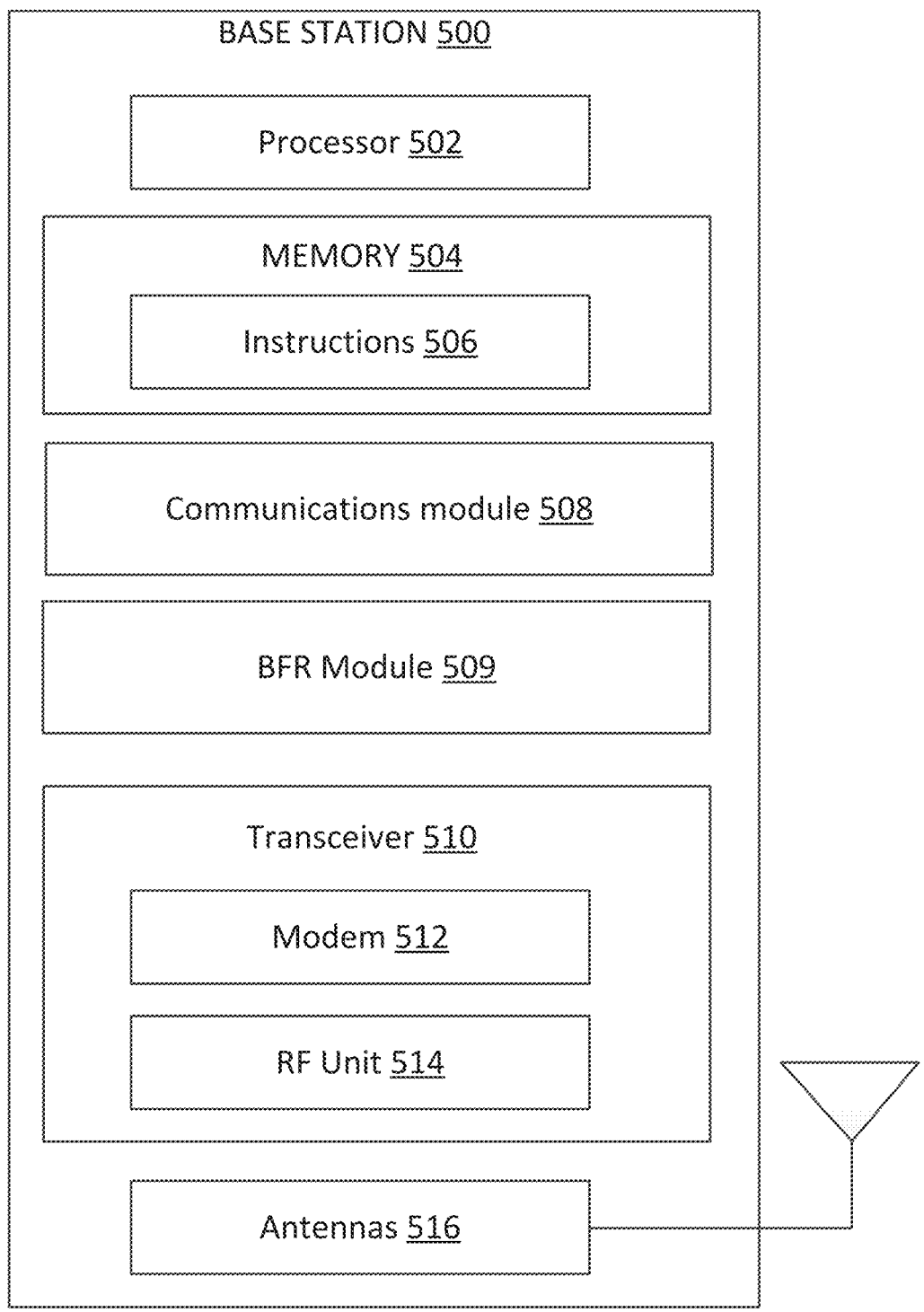
FIG. 5 is a block diagram of an exemplary base station (BS) according to some aspects of the present disclosure.

FIG. 4 is a block diagram of an exemplary UE 400 according to some aspects of the present disclosure. The UE 400 may be a UE 115 discussed above in FIG. 1 and FIG. 2A. As shown, the UE 400 may include a processor 402, a memory 404, communications module 408, a BFD/BFR module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2A-2B, 3A-3C, and 6-11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Communications module 408, through transceiver 410, may establish a connection with at least a first beam group (e.g. TRP) using a first set of one or more beams and a second beam group (e.g. TRP) using a second set of one or more beams, where each of the first beam group and the second beam group are associated with a secondary cell of UE 400. In general, communications module 408, through transceiver 410, may establish a connection with multiple beam groups (e.g. mTRPs).

Communications module 408 may, as described herein, be implemented to realize one or more potential advantages. One implementation may allow the UE 408 to provide BFD indications and candidate beams for particular TRPs in Scells that use multiple TRPs, which may enhance the overall channel quality of the Scell and allow for indication of failed beams of particular TRPs before an overall failure of the Scell. Further, such implementations may allow UE 408 to increase communications reliability, throughput, and user experience, while reducing overall power consumption, among other advantages.

Communications module 408 may be implemented in hardware, code (e.g., software or firmware) executed by a processor, or any combination thereof. If implemented in code executed by a processor, the functions of the communications module 408, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. In particular, communications module 408 may be implemented on processor 402.

The BFD/BFR module 409 may be implemented via hardware, software, or combinations thereof. For example, the BFD/BFR module 409 may be implemented as a processor, circuit, and/or instructions 406 stored in the memory 404 and executed by the processor 402. In some instances, the BFD/BFR module 409 can be integrated within the modem subsystem 412 and communications module 408. For example, the BFD/BFR module 409 can be implemented by a combination of software components (e.g., executed by a DSP or a general processor) and hardware components (e.g., logic gates and circuitry) within the modem subsystem 412.

The BFD/BFR module 409 may be used for various aspects of the present disclosure, for example, aspects of aspects of FIGS. 2A-2B, 3A-3C, and 6-11. The BFD/BFR module 409 is configured to perform beam failure detection (BFD) and beam failure recovery (BFR) techniques as described herein, including construction and transmission of determination of BFD RSs for application in BFD/BFR operation. In particular, BFD/BFR module 409 determines and declares a beam failure for BFD RSs associated with beams in a group of beams used with communications module 408 based on a channel metric associated with the first set of one or more beams dropping below a threshold criteria, select, responsive to the determining to declare the beam failure, one or more of a first uplink control resource associated with the first transmission-reception point or a second uplink control resource associated with the second transmission-reception point for transmission of a recovery request message, and transmit the recovery request message via the selected uplink control resource. The BFD/BFR module 409, with communications module 408, may transmit a beam failure recovery message to one of the multiple beam groups that indicates the failed beam and candidate replacement beams. Aspects of operation of the BFD/BFR module 409 is further discussed below.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the FBE-based communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH control information, PRACH signals, PUSCH data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., SSBs, RMSI, MIB, SIB, FBE configuration, PRACH configuration PDCCH, PDSCH) to the FBE-based communication module 408 for processing. The antennas 416 may include multiple antennas of similar or different designs in order to sustain multiple transmission links. The RF unit 414 may configure the antennas 416.

In an example, the transceiver 410 is configured to receive, from a BS, system information including an FBE configuration indicating a plurality of frame periods, each including a gap period for contention at the beginning of the frame period, and communicate with the BS based on the FBE configuration, for example, by coordinating with the FBE-based communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

FIG. 5 is a block diagram of an exemplary BS 500 according to some aspects of the present disclosure. The BS 500 may be a BS 105 in the network 100 as discussed above in FIG. 1 and FIG. 2A. A shown, the BS 500 may include a processor 502, a memory 504, a communication module 508, a BFR module 509, a transceiver 510 including a modem subsystem 512 and a RF unit 514, and one or more antennas 516. These elements may be in direct or indirect communication with each other, for example via one or more buses, and may, in some cases, be operated on a single processor 502.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3A-3B, and 6-10. Instructions 506 may also be referred to as code, which may be interpreted broadly to include any type of computer-readable statement(s) as discussed above with respect to FIG. 4.

Communications module 508 may establish communications with a UE such as UE 400 via a primary cell and a secondary cell, where communications via the secondary cell use at least a first transmission-reception point using a first set of one or more beams and a second transmission-reception point using a second set of one or more beams, configure a first uplink resource associated with the first transmission-reception point and a second uplink resource associated with the second transmission-reception point for transmission of a recovery request message that indicates a beam failure of the secondary cell at the UE through BFR module 509, receive the recovery request message from the UE in the first uplink resource, and determine in BFR module 509, based on the recovery request message, that the UE has declared a beam failure.

Communications module 508, or its sub-components, may be implemented in hardware, code (e.g., software or firmware) executed by a processor, or any combination thereof. If implemented in code executed by a processor, the functions of communications module 508, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

BFR module 509 is coupled with communications module 508 to receive messages from the UE declaring a beam failure. Various aspects of the present disclosure, for example, aspects of aspects of FIGS. 2A-2B, 3A-3C, and 12 can be executed in BFR module 509.

As shown, the transceiver 510 may include the modem subsystem 512 and the RF unit 514. The transceiver 510 can be configured to communicate bi-directionally with other devices, such as the UEs 115 and/or 300 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 512 (on outbound transmissions) or of transmissions originating from another source such as a UE 115, the UE 315, and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 215 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH control information, PRACH signals, PUSCH data) to the FBE-based communication module 508 for processing. The antennas 516 may include multiple antennas of similar or different designs in order to sustain multiple transmission links.

In an example, the transceiver 510 is configured to transmit, to a UE, system information including an FBE configuration indicating a plurality of frame periods, each including a gap period for contention at the beginning of the frame period, and communicate with the UE based on the FBE configuration, for example, by coordinating with the FBE-based communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

As discussed above, responding to a beam failure detection (BFD) in a UE such as UE 400 involves communication of a transmission-receive point (TRP) specific beam failure recover (BFR), includes identifying a set of BFD reference signals (RS) indicating TRP beams on which the BFD process is operating. Aspects of the present disclosure are directed to determination of those BFD RSs.

Figure 6:
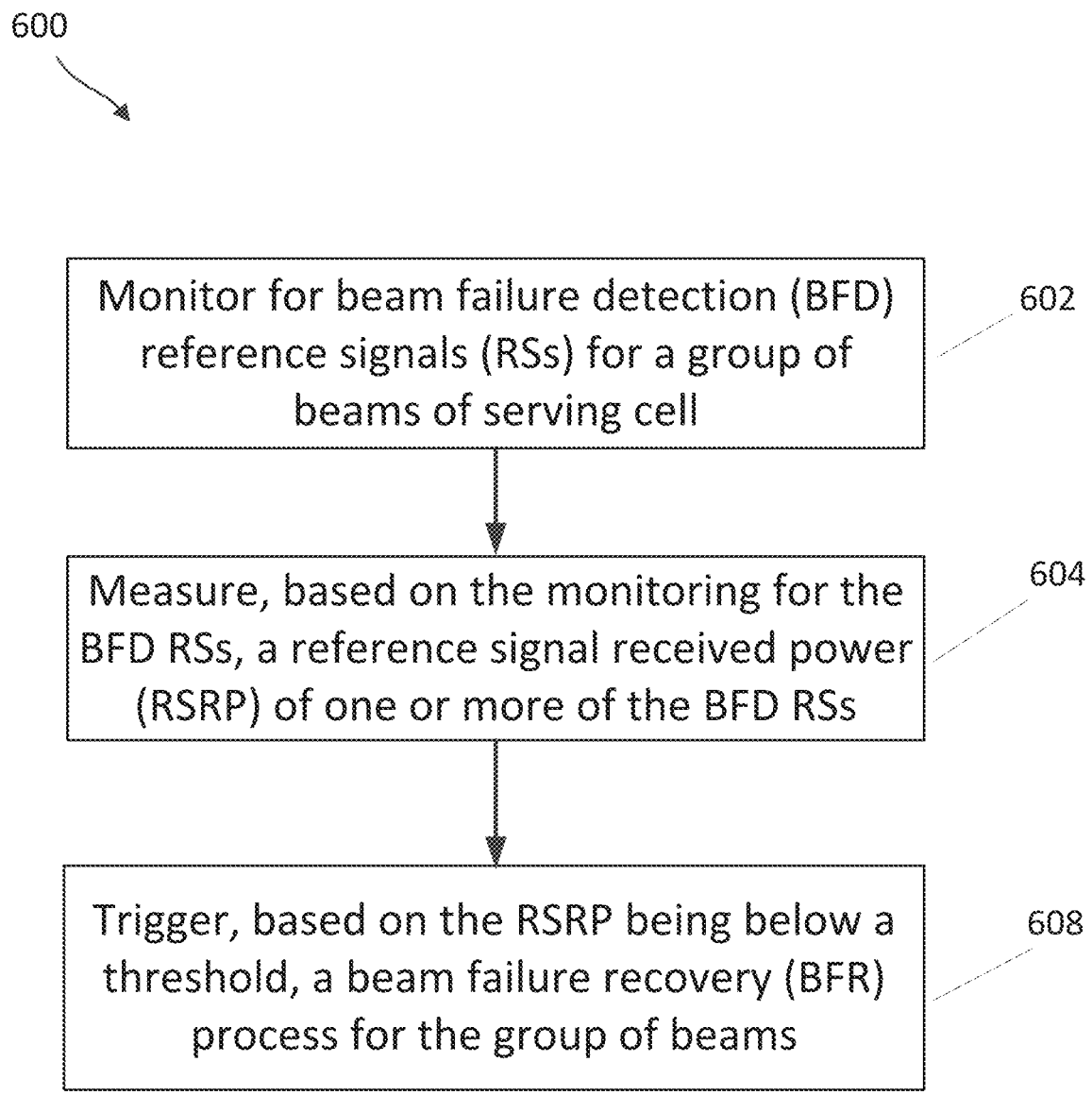
FIG. 6 illustrates operation of a UE according to some aspects of the present disclosure.

FIG. 6 illustrates method 600 of a UE according to some aspects of the present disclosure. Steps of the method 600 can be executed by a UE, such as but not limited to UE 115, UE 205, UE 310, UE 344, UE 374, or UE 400, which may utilize one or more components, such as the processor 402, the memory 404, the communications module 408, the BFD/BFR module 409, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

In step 602 of method 600, the UE monitors and retrieves BFD RSs for a group of beams in a serving cell. In some aspects, the group of beams may be associated with a group beam identifier.

In step 604, UE measures a reference signal received power (RSRP) on the BFD RSs that are determined in step 602.

In step 608, if the RSRP is below a threshold for a beam in the group of beams associated with the BFD RSs, then UE triggers a beam failure recovery (BFR) for the group of beams. In some aspects, configuration data has been received by the UE from a base station in a PDCCH communication or series of PDCCH communications that include DCIs.

In one aspect of step 602, wherein configuration information is received in multiple DCI each including a configuration corresponding to a TRP in a plurality of TRPS, the BFD RSs corresponding to each TRP can be explicitly indicated. In that example, each of the plurality of DCI communications includes a radio link monitoring configuration element and a TRP identifier for each BFD RS. In some cases, each of the plurality of DCI communications includes a common radio link monitoring configuration element. In some examples, the TRP identifier can be associated with a CORSET pool index. In some aspects, each of the plurality of DCI communications includes a radio link monitoring configuration element associated with a different TRP of the plurality of TRPs.

In some aspects, the group of beams are associated with a transmission-reception point (TRP). In some aspects, the group beam identifier is a TRP identifier.

Some aspects of method 600 further comprise receiving a plurality of downlink control information (DCI) communications, each of the plurality of DCI communications including a configuration corresponding to a TRP of a plurality of TRPs. In some aspects, the configuration of each of the plurality of DCI communications explicitly indicates the BFD RSs corresponding to the TRP of the plurality of TRPs. In some aspects, each of the plurality of DCI communications includes a radio link monitoring configuration element and a TRP identifier. In some aspects, each of the plurality of DCI communications includes a common radio link monitoring configuration element. In some instances, the TRP identifier is associated with a control resource set (CORESET). In some aspects, each of the plurality of DCI communications includes a radio link monitoring configuration element associated with a different TRP of the plurality of TRPs. In some aspects, the configuration of each of the plurality of DCI communications implicitly indicates the BFD RSs corresponding to the TRP of the plurality of TRPs.

Some aspects of method 600 further comprise determining one or more BFD RSs for each TRP of the plurality of TRPs. In some aspects, the monitoring for the BFD RSs for the group of beams comprises monitoring, based on the determining, for the one or more BFD RSs for at least one TRP of the plurality of TRPs. In some aspects, the determining the one or more BFD RSs for each TRP of the plurality of TRPs comprises determining the one or more BFD RSs for each TRP of the plurality of TRPs based on one or more transmission configuration index (TCI) states for one or more control resource sets (CORESETs) associated with the TRP. In some aspects, the determining the one or more BFD RSs for each TRP of the plurality of TRPs further comprises determining the one or more BFD RSs for each TRP of the plurality of TRPs based on a first number TCI states for the one or more CORESETs associated with each TRP of the plurality of TRPs and a second number of TCI states across the plurality of TRPs, wherein the first number satisfies a first threshold and the second number satisfies a second threshold.

Further, in some aspects, the UE may receive from a base station an indication of the first threshold and an indication of the second threshold. The UE may also select the first number of TCI states for each TRP of the plurality of TRPs based on at least one of a TCI state ID, a CORESET ID, or a RS periodicity. In some aspects, the determining the one or more BFD RSs for each TRP of the plurality of TRPs further comprises determining the one or more BFD RSs for each TRP of the plurality of TRPs based on quasi co-location (QCL)-type information associated with the one or more TCI states for the one or more CORESETs associated with the TRP. In some aspects, the determining the one or more BFD RSs for each TRP of the plurality of TRPs based on the QCL-type information comprises prioritizing QCL-type D information over one or more of QCL-type A information, QCL-type B information, or QCL-type C information.

Some aspects of method 600 further comprise receiving a single downlink control information (DCI) communication, the single DCI communication including configuration information for a plurality of TRPs. In some aspects, the configuration information explicitly indicates the BFD RSs for each TRP of the plurality of TRPs. In some aspects, the configuration information includes a radio link monitoring configuration element and an indication of a TRP. In some aspects, the configuration information includes a common radio link monitoring configuration element for the plurality of TRPs. In some aspects, the configuration information includes a radio link monitoring configuration element for each of the plurality of TRPs. In some aspects, the BFD RSs for each TRP of the plurality of TRPs are based on a physical cell identifier (PCI). In some aspects, the PCI is for a non-serving cell. In some aspects, the BFD RSs for each TRP of the plurality of TRPs are further based on at least one of a transmission configuration index (TCI) state or quasi co-location (QCL)-type information.

In some aspects of method 600, the configuration information implicitly indicates the BFD RSs for each TRP of the plurality of TRPs. Further, in some aspects, the UE may determine one or more BFD RSs for each TRP of the plurality of TRPs. In some aspects, the monitoring for the BFD RSs for the group of beams comprises monitoring, based on the determining, for the one or more BFD RSs for at least one TRP of the plurality of TRPs. In some aspects, the determining the one or more BFD RSs for each TRP of the plurality of TRPs comprises determining the one or more BFD RSs for each TRP of the plurality of TRPs based on an order index of transmission configuration index (TCI) states for one or more control resource sets (CORESETs) associated with the TRP. In some aspects, the determining the one or more BFD RSs for each TRP of the plurality of TRPs further comprises determining the one or more BFD RSs for each TRP of the plurality of TRPs based on a first number TCI states for TCI states with a common order index, wherein the first number satisfies a first threshold. In some aspects, a total number of TCI states across all order indexes of the TCI states satisfies a second threshold.

In some aspects, the determining the one or more BFD RSs for each TRP of the plurality of TRPs comprises determining the one or more BFD RSs for each TRP of the plurality of TRPs based on transmission configuration index (TCI) state pairs associated with the TRP, wherein each TCI state in a TCI state pair is associated with a control resource set (CORESET). In some aspects, the determining the one or more BFD RSs for each TRP of the plurality of TRPs comprises disregarding a TCI codepoint having only one TCI state.

In some aspects of method 600, the configuration information indicates a transmission-reception point (TRP) identifier (ID) for a CORESET TCI state based on at least one of a CORESET ID or a TCI state ID. In some aspects, the determining the one or more BFD RSs for each TRP of the plurality of TRPs further comprises determining one or more BFD RSs for each TRP ID based on up to a first number TCI states for one or more CORESETs associated with each TRP ID and a second number of TCI states across all TRP IDs, wherein the first number satisfies a first threshold and the second number satisfies a second threshold. In some aspects, a value of the CORESET ID indicates the TRP ID. In some aspects, a value of the TCI State ID indicates the TRP ID. In some aspects, the UE may receive from a base station an indication that the TRP ID will be indicated by at least one of the CORESET ID or the TCI state ID. The UE may also receive from the base station at least one of a mapping of CORESET ID values to TRP IDs or a mapping of TCI state ID values to TRP IDs.

In some aspects of method 600, each transmission configuration index (TCI) state for one or more control resource sets (CORESETs) associated with the TRP is associated with a TRP identifier (ID). In some aspects, the determining the one or more BFD RSs for each TRP of the plurality of TRPs further comprises determining one or more BFD RSs for each TRP ID based on up to a first number TCI states for the one or more CORESETs associated with each TRP ID and a second number of TCI states across all TRP IDs, wherein the first number satisfies a first threshold and the second number satisfies a second threshold. In some aspects, the TRP ID is indicated based on a physical cell identifier (PCI)

associated with each TCI state. In some aspects, the PCI is for the serving cell. In some aspects, the PCI is for a non-serving cell.

Some aspects of method 600 further comprise receiving, from a base station, an indication whether transmission-reception point (TRP)-specific BFD is enabled. In some aspects, the monitoring for the BFD RSs is based on the indication whether TRP-specific BFD is enabled. In some aspects, the indication includes an explicit indication. In some aspects, the indication includes a flag associated with TRP-specific BFD. In some aspects, the indication includes an implicit indication. In some aspects, the implicit indication includes at least one of TRP-specific BFD medium access control (MAC) parameter. In some aspects, the TRP-specific BFD MAC parameter includes at least one of a counter or a timer.

Figure 7:
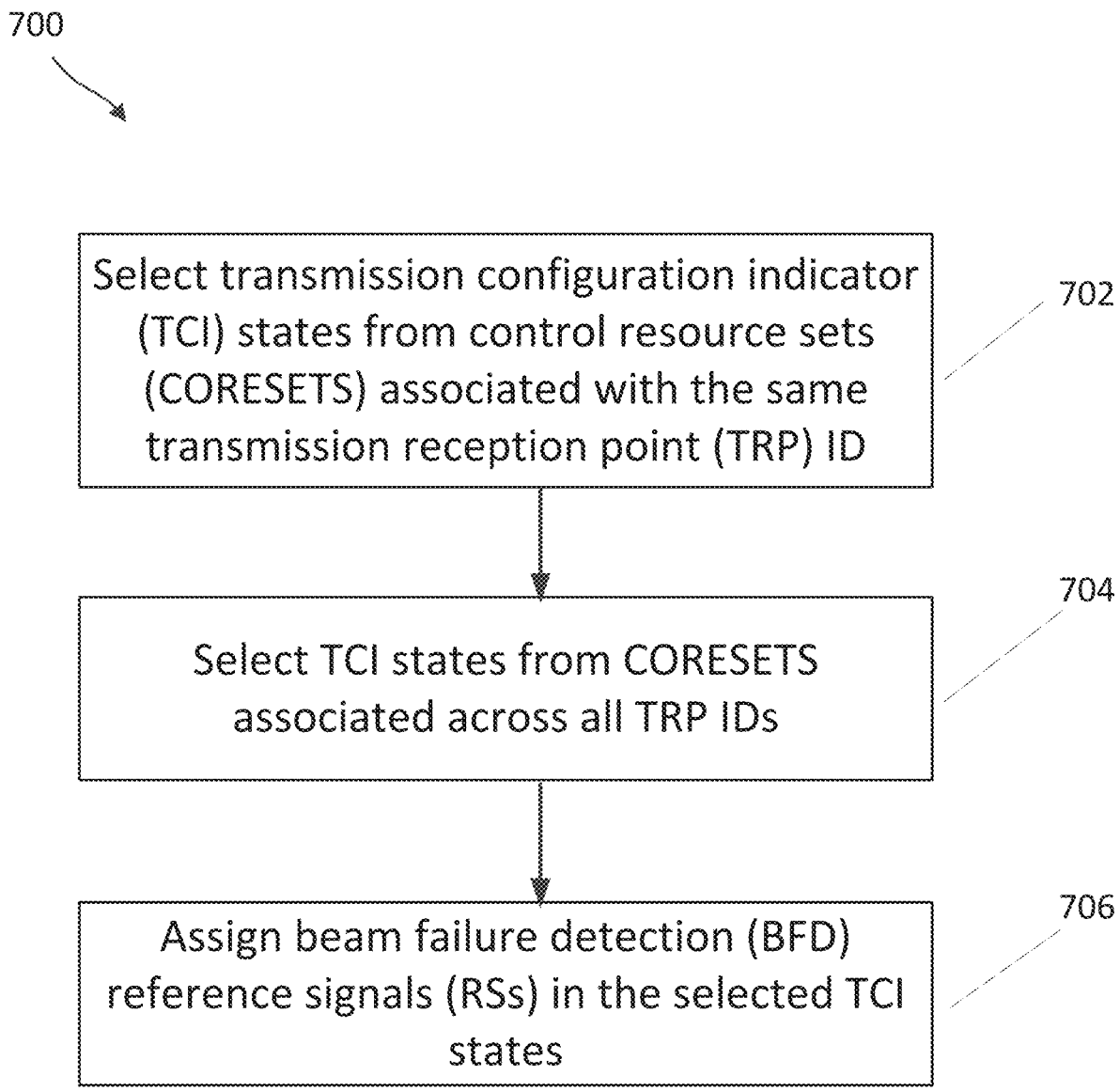
FIG. 7 illustrates an example of beam failure detection (BFD) reference signal (RS) determination according to some embodiments of the present disclosure.

FIG. 7 illustrates another aspect of step 602, where configuration information is received in multiple DCI communications but where the BFD RSs are not explicitly indicated. In this example, BFD RSs can be implicitly determined based on TCI states included in CORESETs. As illustrated in FIG. 7, in step 702 TCI states are selected from CORESETs associated with the same TRP ID. In particular, for each TRP ID in the set of TRPs, a first number (up to X) of TCI stats are selected from CORESETs associated with that same TRP ID. In step 704, across all TRP IDs in the set of TRP IDs, select a second number (up to Y) of TCI states from CORESETs, regardless of TRP ID.

The threshold values X and Y can be determined by specification, by UE implementation, or may be configured by a base station. Selection rules for selecting the TCI states can also be determined by specification, by UE implementation, or configured by the base station. In some cases, the TCI states can be selected based on TCI state ID or CORESET ID. In other cases, the TCI states can be selected based on RS periodicity.

In step 706, the BFD RSs are provided by the quasi co-located (QCL) RSs in the TCI states. In particular, preferentially the QCL-TypeD RSs in the TCI state is used, otherwise QCL-TypeA/B/C RSs in the TCI state may be used.

In another aspect of step 602 in a single DCI based multi-TRP situation, in some examples if the BFD RSs are explicitly indicated in the DCI communications, then BFD RSs are included in a radio link monitoring configuration element as discussed above. In some examples, the TRP ID can be the TCI state order index or other identifier to access the explicitly configured BFD RSs for the TRPs in the set of TRPs.

In another aspect of step 602, the BFD RSs can are explicitly determined by a physical cell identifier (PCI) associated with the BFD RS, a QCL Source RS, or other QCL Source RS. The PCI can be the one associated with the service cell or may be one associated with a non-serving neighbor cell. As discussed above, a QCL-TypeD RS is preferred, but QCL TypeA/B/C RSs can be explicitly assigned as the BFD RS. In some cases, the QCL source RS can be indicated explicitly in a TCI state applied to the target BFD RS. Implementation of this aspect is dependent on the assumption that the QCL source RS of a CORESET TCI state can be transmitted by a TRP with a particular PCI.

Figure 8A:
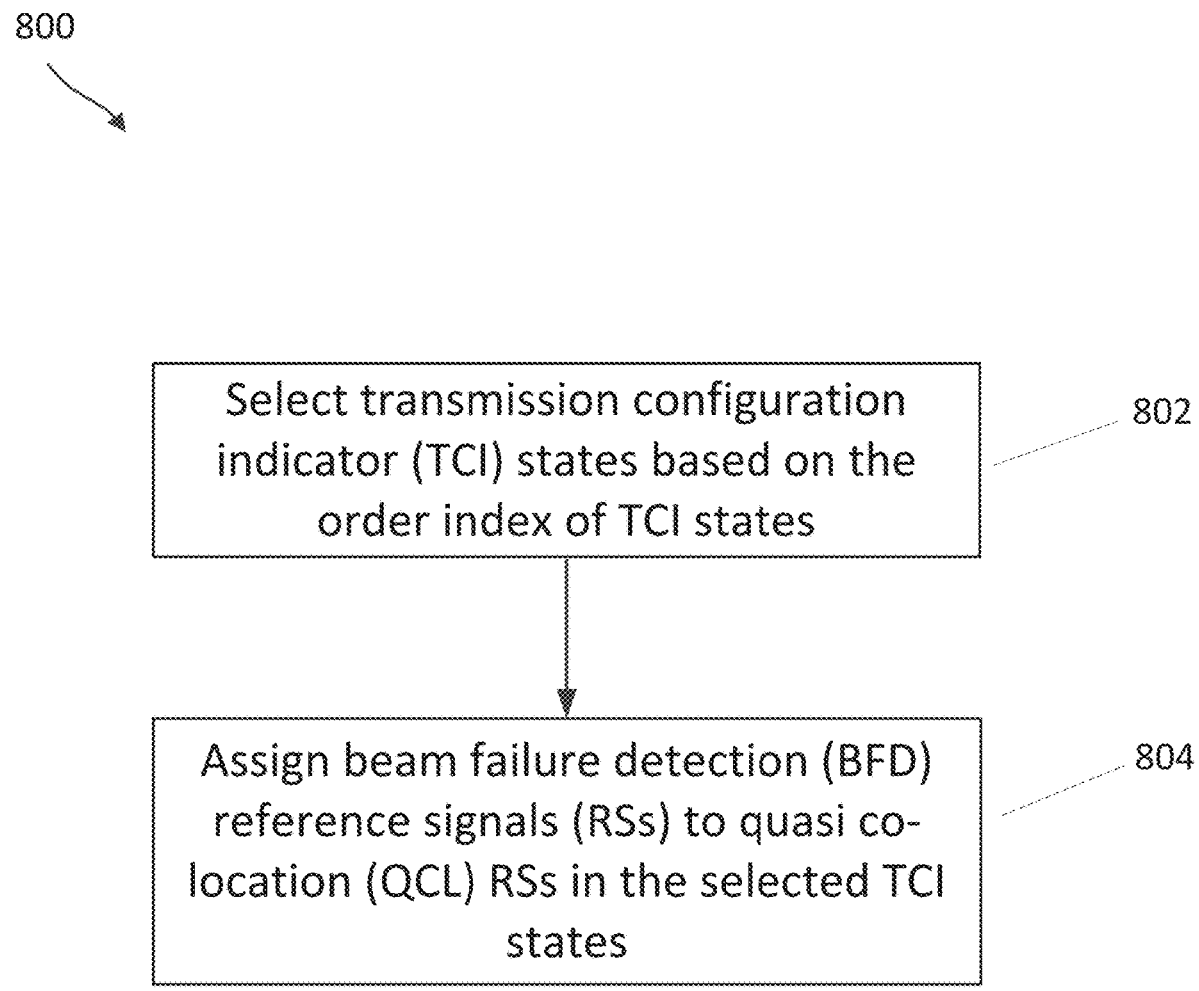

FIGS. 8A and 8B illustrate another aspect of step 602. In this aspect, the base station configures at least two CORESET TCI states with different order indexes in corresponding TCI pairs, where the same TCI state cannot be configured with two different order indexes. This arrangement is illustrated in FIG. 8B.

FIG. 8B illustrates a CORESET DCI TCI field 810 having TCI states with TCI state $ID_{i,j}$ indices (i,j) where i represents the index of the codepoint of the DCI TCI field and j is the order point in the codepoint. TCI state $ID_{i,j}$ indicates the jth TCI indicated for the ith codepoint in the DCI TCI field 810. The TCI codepoint to which the TCI states are mapped can be determined by its ordinal position among all the TCI code points. TCI state $ID_{i,j}$ with j>1 may be optional based on an indicator C. The DCI TCI field 810 can be identified by a servicing cell ID and a band-width portion (BWP) ID.

In most cases, each codepoint in the DCI TCI field 810 includes two TCI states. Consequently, each CORESET TCI state is one of two TCI states mapped to a TCI codepoint. In that case, the TCI state order index of the corresponding TCI pair in the TCI codepoint can serve as the implicit TRP ID of the TCI state. Although TCI state pairs are indicated for each codepoint in this example, it should be understood that each codepoint can include any number of TCI states where BFD RS determination can be performed similar to this example.

In an example in step 802, using the CORESET DCI TCI field 810 as described above, a first number (up to X) of TCI states with the same order index j. In some examples, a first number of TCI states with a first order index and a second number of TCI states with a second order index can be formed for a total number of TCI states that is less than a maximum value (Y).

In a second example of step 802, a first number (up to X) of TCI pairs (i.e. both TCI states associated with each codepoint) can be chosen. In some aspects, the TCI pairs can be chosen from lowest to highest codepoint number, although other selection criteria may be implemented. In this example, both TCI states in the TCI pair can be used as CORESET TCI states.

In step 802, if the TCI codepoint only includes a single TCI state and used as a CORESET TCI state, then the process discussed the TCI states with the only order available may be chosen.

In step 804, the BFD RSs are assigned to QCL RSs associated with the selected TCI states as previously discussed. In particular, QCL RSs from the selected TCI states are assigned to BFD RSs with preferences give to QCL-Type D RSs.

Figure 9A:
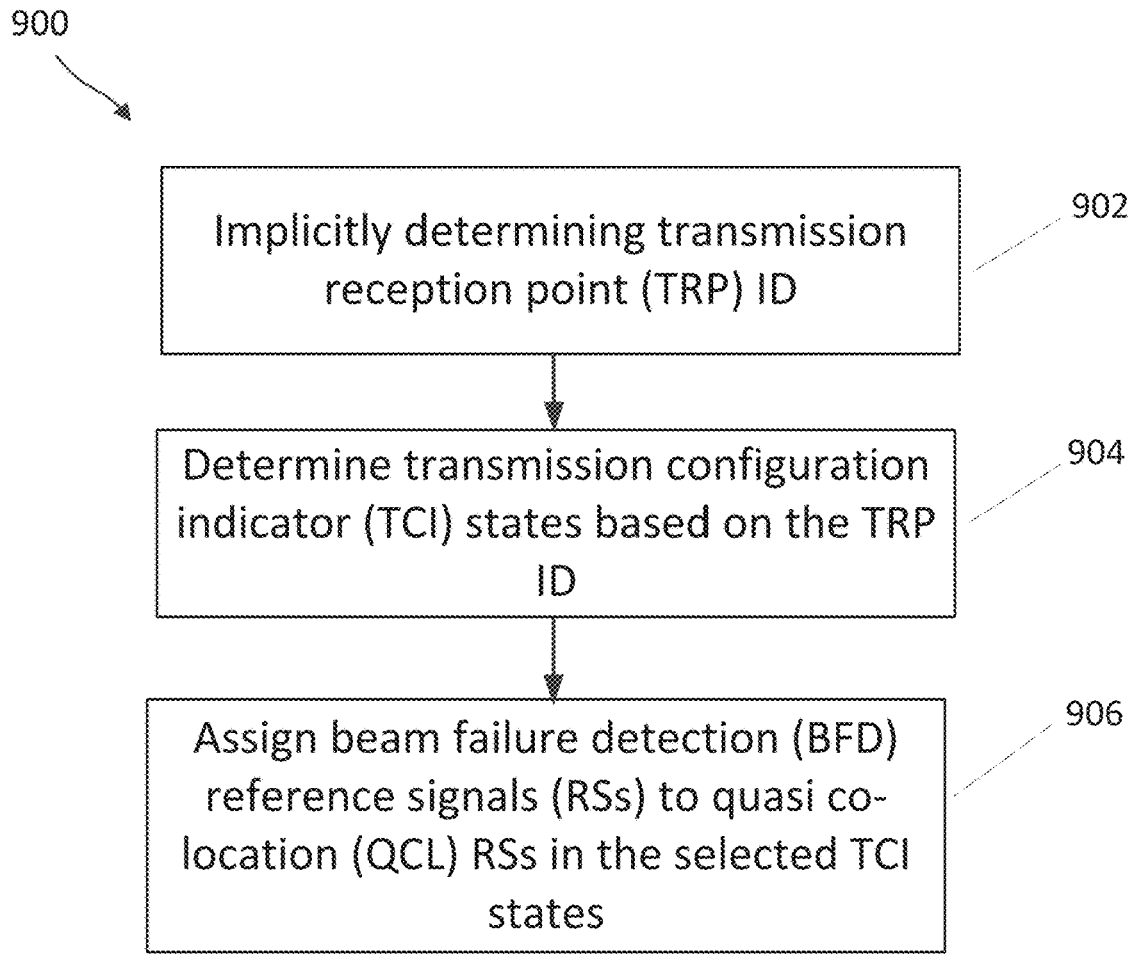
FIGS. 9A and 9B illustrate another example of a BFD RS determination according to some aspects of the present disclosure.
Figure 9B:
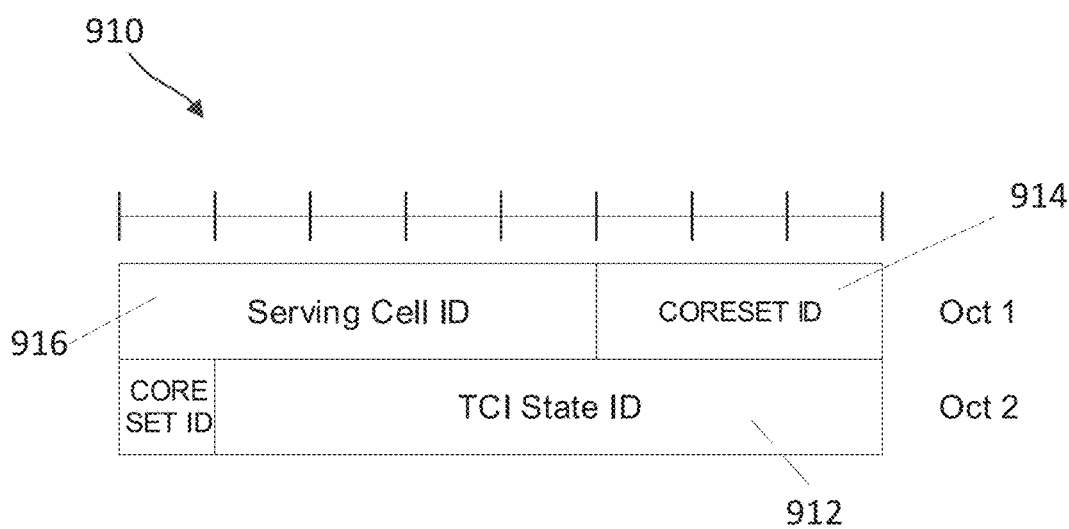

FIGS. 9A and 9B illustrate another aspect of step 602 according to the present disclosure. In this aspect, an implicit determination of the BFD RSs in a single-DCI situation. In this aspect, the QCLed RSs with CORESET TCI states are used to implicitly determining the BFD RSs in step 602. FIG. 9B illustrates an example TCI state indication 910 with TCI State IDs 912 listed along with CORESET ID values 914. The TCI state IDs 912 are associated with a serving cell ID 916. In step 902 of FIG. 9A, the TRP ID of a CORESET TCI state can be implicitly indicated by the CORESET ID 914 or by the TCI state ID 912. This aspect may be particularly applicable if the CORSET does not have a CORESET Pool Index of has the same CORESET Pool Index (e.g., 0).

As is illustrated by the example TCI state indication 910 illustrated in FIG. 9B, CORESET ID 914 may be a 4-bit CORESET ID. Consequently, in step 902 the TRP ID of a CORESET TCI state two TRP IDs can be indicated by the first bit in the CORESET ID (e.g. CORESET ID with value 0-7 are assigned to a first TRP while CORESET ID values of between 8 and 15 are assigned to a second TRP). However, the split of TCI states between TRP IDs may be different. Similarly, if the TRP ID can be implicitly indicated by the first bit of the TCI state ID. In that case, with an 8-bit TCI state 912, TCI state ID values of between 0 and 127 are assigned to a first TRP while TCI state ID values of between 128 and 255 are assigned to a second TRP. Again, the split of TCI states between TRP IDs may be different.

In step 904, the TCI states are determined based on the implicitly determined TRP ID from step 902. In one example, for each implicit TRP ID a first number (up to X) of TCI states for CORESETs associated with the same TRP ID are selected. In additional, across all implicit TRP IDs, a second number (up to Y) of TCI states for CORESETs are selected, regardless of the CORESET association with the TRP ID. The threshold values of X and Y may be determined by specification, determined by UE implementation, or may be configured by a base station. Similarly, selection rules for how the first number of TCI states are chosen and the second number of TCI states are chosen can be determined by specification, determined by UE implementation, or may be configured by a base station.

In step 906, the QCI RSs of the first number of TCI states and the second number of TCI states can be used to assign BFD RS, as has been discussed above. In particular, preferentially QCI-TypeD RSs are assigned, but QCI-TypeA/B/C RSs may also be used.

For each of the aspects as illustrated in FIGS. 8A and 8B or in FIGS. 9A and 9B, the base station may indicate an enablement of one or both of these aspects in order that the UE can interpret the TRP ID per CORESET TCI state by the corresponding TCI state order index or the CORESET/TCI state ID, respectively. Enablement of the aspects illustrated in FIGS. 9A and 9B may also indicate the split of CORSET/TCI state ID space among different TRP IDs. The split may be determined by specification or by UE implementation as well. Where these features are enabled by the UE, in some aspects, the UE will assume they are enabled.

Figure 10:
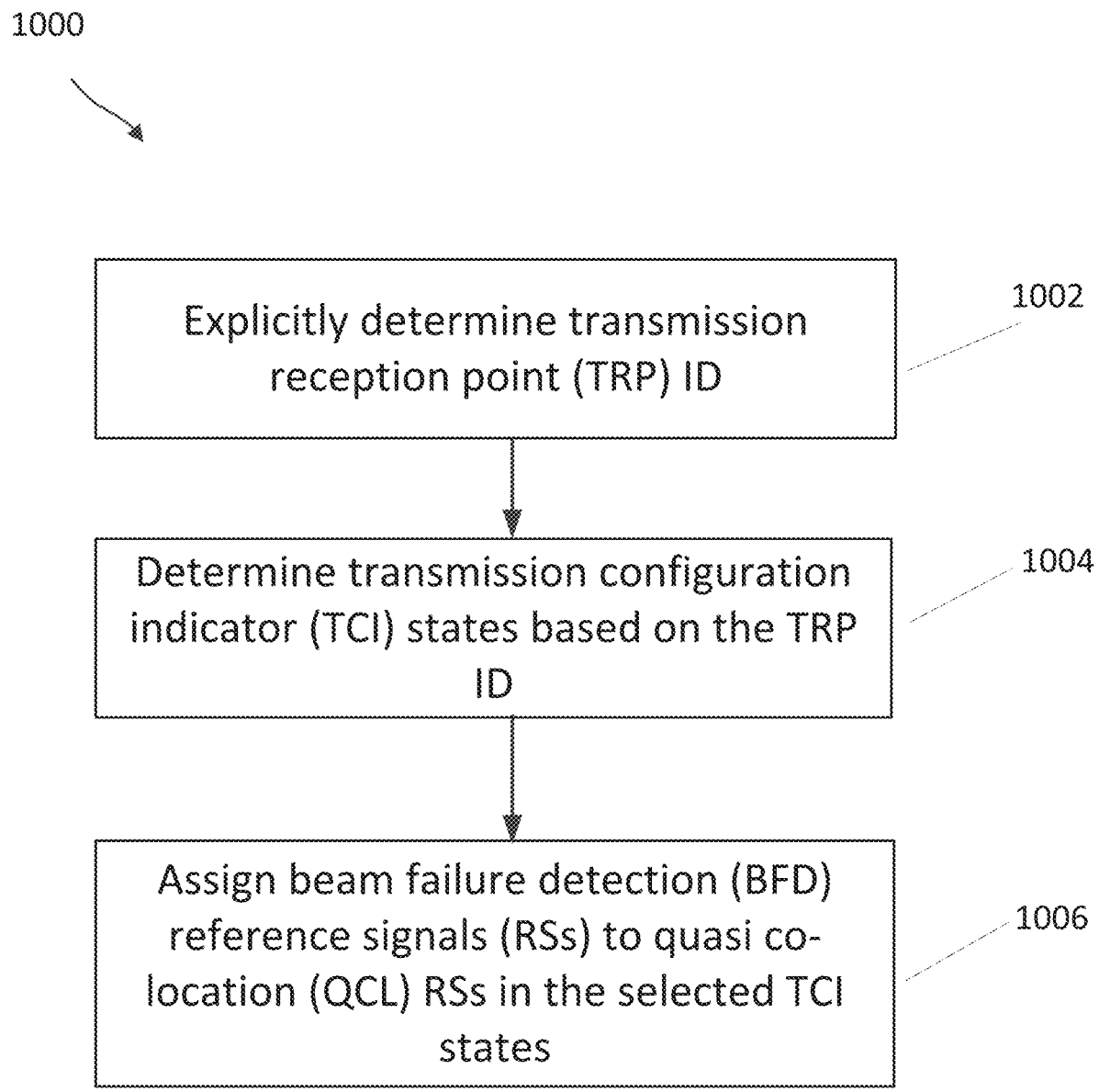
FIG. 10 illustrates another example of a BFD RS determination according to some aspects of the present disclosure.

FIG. 10 illustrates another aspect of determination of BFD RSs in step 602. In the aspect illustrated in FIG. 10, each TCI state (e.g. TCI state 912) is explicitly configured with a TRP ID, at least for TCI states selected for CORESET, such that the UE knows the CORESET TCI state is from which TRP ID. In particular, a base station has configured CORESET IDs or TCI State IDs with TRP IDs in a configuration communication.

In step 1004, the TCI states are determined based on the explicitly determined TRP ID from step 1002. In some examples, for each implicit TRP ID a first number (up to X) of TCI states for CORESETs associated with the same TRP ID are selected. In additional, across all implicit TRP IDs, up to a second number (up to Y) of TCI states for CORESETs are selected, regardless of the CORESET association with the TRP ID. The threshold values of X and Y may be determined by specification, determined by UE implementation, or may be configured by a base station. Similarly, selection rules for how the first number of TCI states are chosen and the second number of TCI states are chosen can be determined by specification, determined by UE implementation, or may be configured by a base station.

In step 1006, the QCI RSs of the first number of TCI states and the second number of TCI states can be used to assign BFD RS, as has been discussed above. In particular, preferentially QCI-TypeD RSs are assigned, but QCI-TypeA/B/C RSs may also be used.

Figure 11:
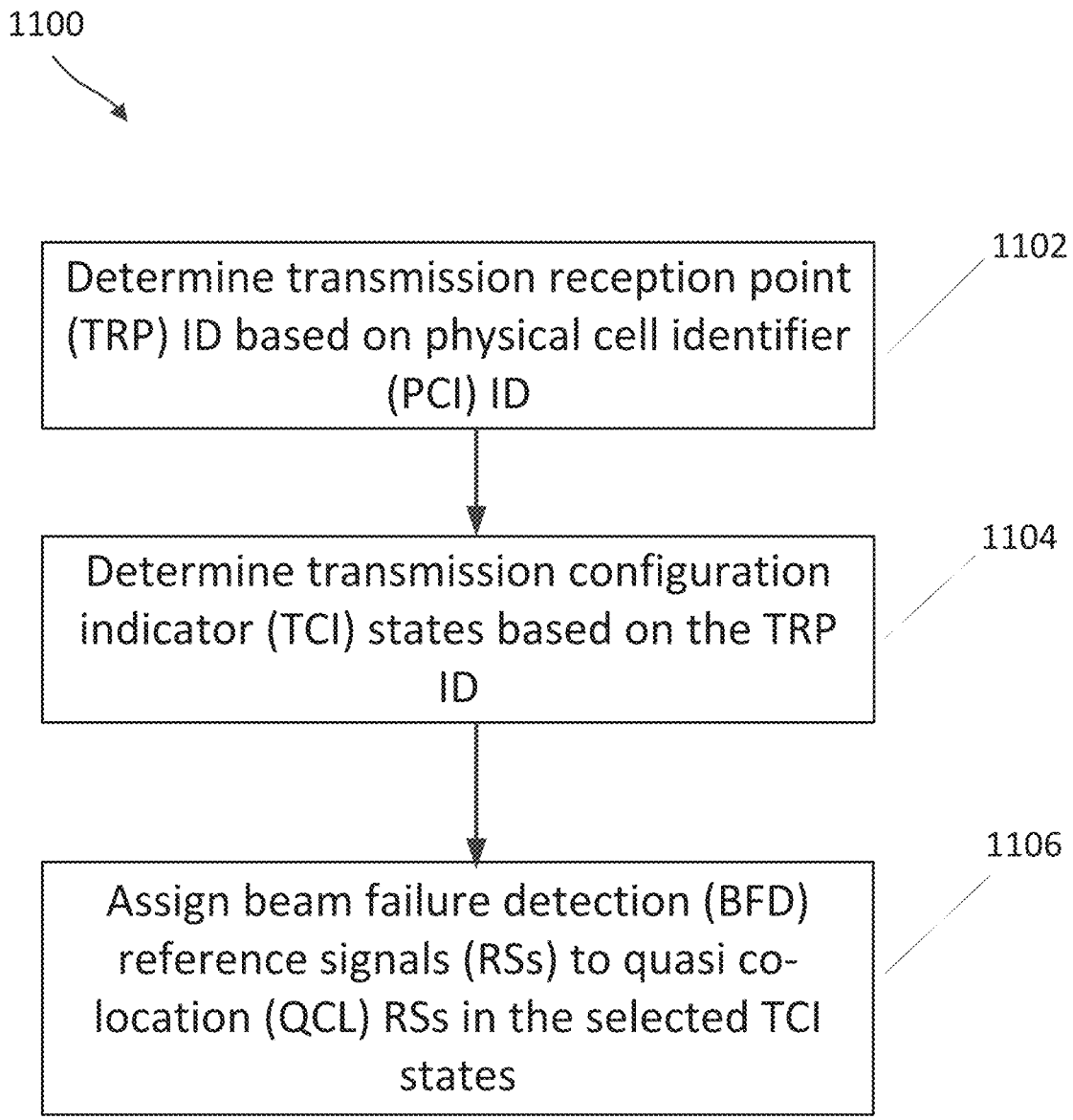
FIG. 11 illustrates another example of a BFD RS determination according to some aspects of the present disclosure.

FIG. 11 illustrates another aspect of BFD RS determination in step 602. As illustrated in FIG. 11, the TRP ID is identified based on the PCI ID associated with the TCI state or a RS using the TCI state, has was discussed previously above. In particular, the TRP ID can based on a physical cell identifier (PCI) associated with the BFD RS, a QCL Source RS, or other QCL Source RS. The PCI can be the one associated with the service cell or may be one associated with a non-serving neighbor cell.

In step 1104, the TCI states are determined based on the explicitly determined TRP ID from step 1002. In some examples, for each implicit TRP ID a first number (up to X) of TCI states for CORESETs associated with the same TRP ID are selected. In additional, across all implicit TRP IDs, up to a second number (up to Y) of TCI states for CORESETs are selected, regardless of the CORESET association with the TRP ID. The threshold values of X and Y may be determined by specification, determined by UE implementation, or may be configured by a base station. Similarly, selection rules for how the first number of TCI states are chosen and the second number of TCI states are chosen can be determined by specification, determined by UE implementation, or may be configured by a base station.

In step 1106, the QCI RSs of the first number of TCI states and the second number of TCI states can be used to assign BFD RS, as has been discussed above. In particular, preferentially QCI-TypeD RSs are assigned, but QCI-TypeA/B/C RSs may also be used.

Figure 12:
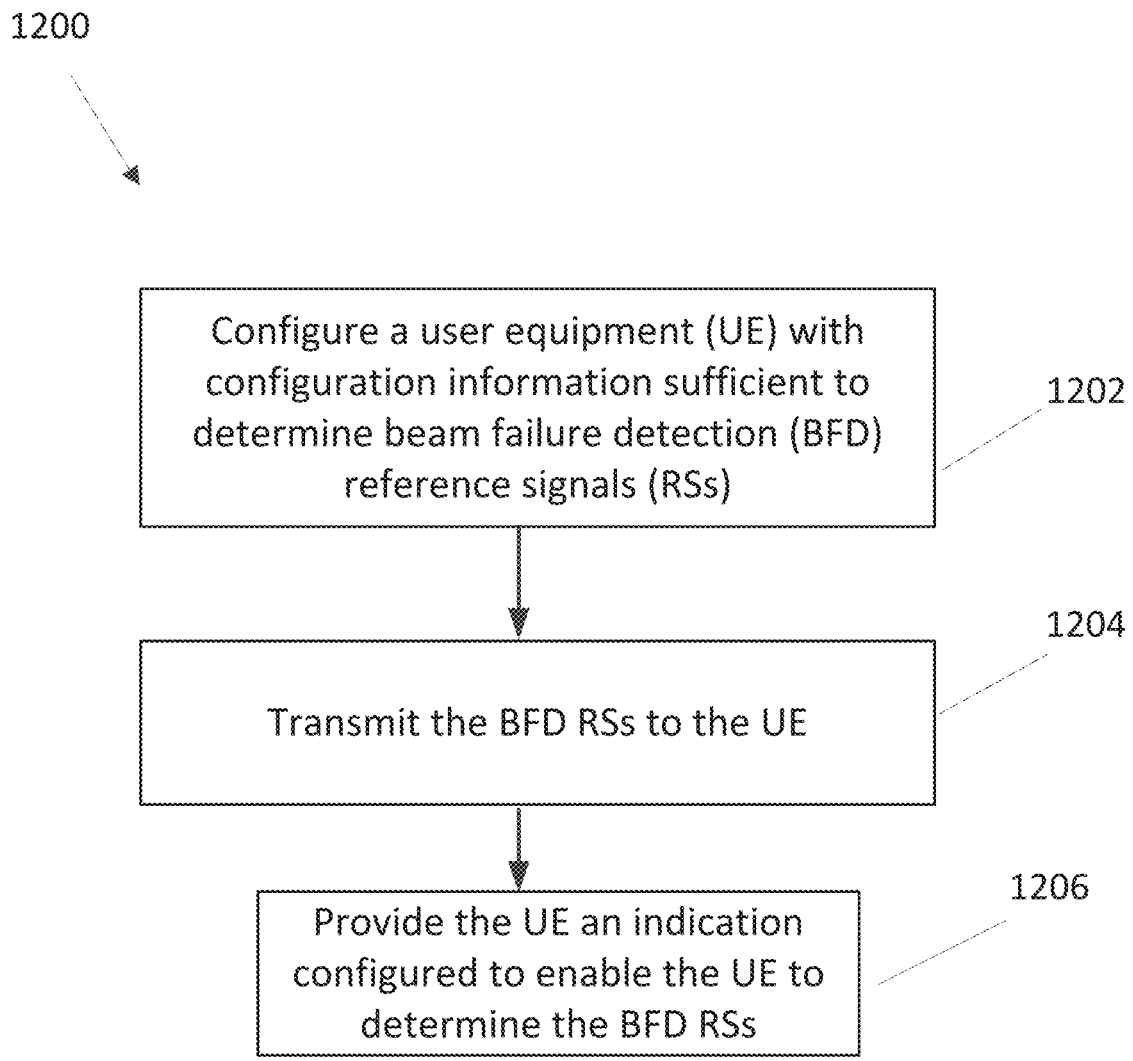
FIG. 12 illustrates operation of a base station (BS) according to some aspects of the present disclosure.

FIG. 12 illustrates method 1200 of a base station (BS) in accordance with aspects of this disclosure. Steps of the method 1200 can be executed by a BS, such as but not limited to BS 105, BS 215, BSs including PCell 342 and/or Scell 346, BSs including PCell 372 and/or Scell 376, or BS 500, which may utilize one or more components, such as the processor 502, the memory 504, the communications module 508, the BFR module 509, the transceiver 510, the modem 512, and the one or more antennas 516, to execute the steps of method 1200. As illustrated, the method 1200 includes a number of enumerated steps, but aspects of the method 1200 may include additional steps before, after, and in between the enumerated steps. In some aspects, one or more of the enumerated steps may be omitted or performed in a different order.

In step 1202, the BS may transmit to a user equipment (UE) at least one DCI communications with an indication of beam failure detection (BFD) reference signals (RSs) for a group of beams of a serving cell. For example, the BS provides one or more DCI communications that provide configuration information to the UE. As discussed above, the configuration information can include explicit TRP BFD RS designations, CORESET TCI state information, threshold parameters as discussed above, or other information.

In step 1204, the BS transmits the BFD RSs to the UE.

In step 1206, the BS may receive from the UE a beam failure recovery (BFR) message. In some aspects, the indication may be provided to the UE dynamically. In some aspects, the BS can dynamically indicate enablement of features regarding determination of BFD RSs as discussed above, i.e., the indication may indicate whether or not a TRP specific BFD is enabled. In particular, the indication provided by the BS to the UE may indicate to the UE that BFD RSs are to be selected per TRP (i.e., a TRP specific BFD RS) for operation in a TRP specific BFD/BFR process instead of being selected for a serving cell.

In some aspects, each of the at least one DCI communications includes configuration information that corresponds to a transmission reception point (TRP) of a plurality of TRPs. In some aspects, the configuration information explicitly indicates the BFD RSs for the TRP of the plurality of TRPs. In some aspects, the at least one DCI communications includes transmission configuration information (TCI) states in one or more control resource sets (CORESETS) associated with the plurality of TRPs from which the BFD RSs can be determined. In some aspects, the DCI at least one communications includes threshold values that the UE uses to determine the BFD RSs from the TCI states.

In some aspects, the at least one DCI communications may include a single downlink control information (DCI) communication with the configuration information that corresponds to a plurality of TRPs. In some aspects, the single DCI communication includes an explicit assignment of the BFD RSs with a TRP of the plurality of TRPs. In some aspects, the single DCI communication includes the configuration information where a TRP ID for the TRP is determined by a physical cell identifier (PCI). In some aspects, the single DCI communication includes TCI states of CORESETs associated with the plurality of TRPs, from which the BFD RSs can be determined. In some aspects, the CORESETs includes TCI pairs. In some aspects, either a CORESET ID is mapped to a TRP ID or a TCI state ID is mapped to a TRP ID. In some aspects, the indication includes a flag for determining whether the CORESET ID is mapped to the TRP ID or the TCI state ID is mapped to the TRP ID. In some aspects, the indication includes an identification of a split of the CORESET ID or the TCI state ID between different TRP IDs.

In some aspects, the indication explicitly enables TRP specific BFD by the UE, and indicates that the BFD RSs are associated with TRPs in a plurality of TRPs. In some aspects, the indication implicitly enables TRP specific BFD by the UE by inclusion of one or more beam failure detection (BFD) parameters. In some aspects, the BFD parameters includes one or more of a BFI counter, a beam failure detection timer, or a BFD threshold value.

In some aspects, the indication can be provided explicitly by a flag transmitted to the UE (e.g. with a TRP specific BFR enablement flag). In some aspects, this enablement can be implicit. For example, if TRP specific BFD MAC parameters are configured in step 1202, then there is an implicit enablement. TRP specific BFD MAC parameters can include a BFI counter, beam failure detection timer. Implicit enablement may be indicated by the presence of other parameters, for example a BFD threshold (e.g. a RSRP threshold values (Qout_LR)) for BFD indicator generation, beam failure instance maximum count, or other parameters.

Figure 13:
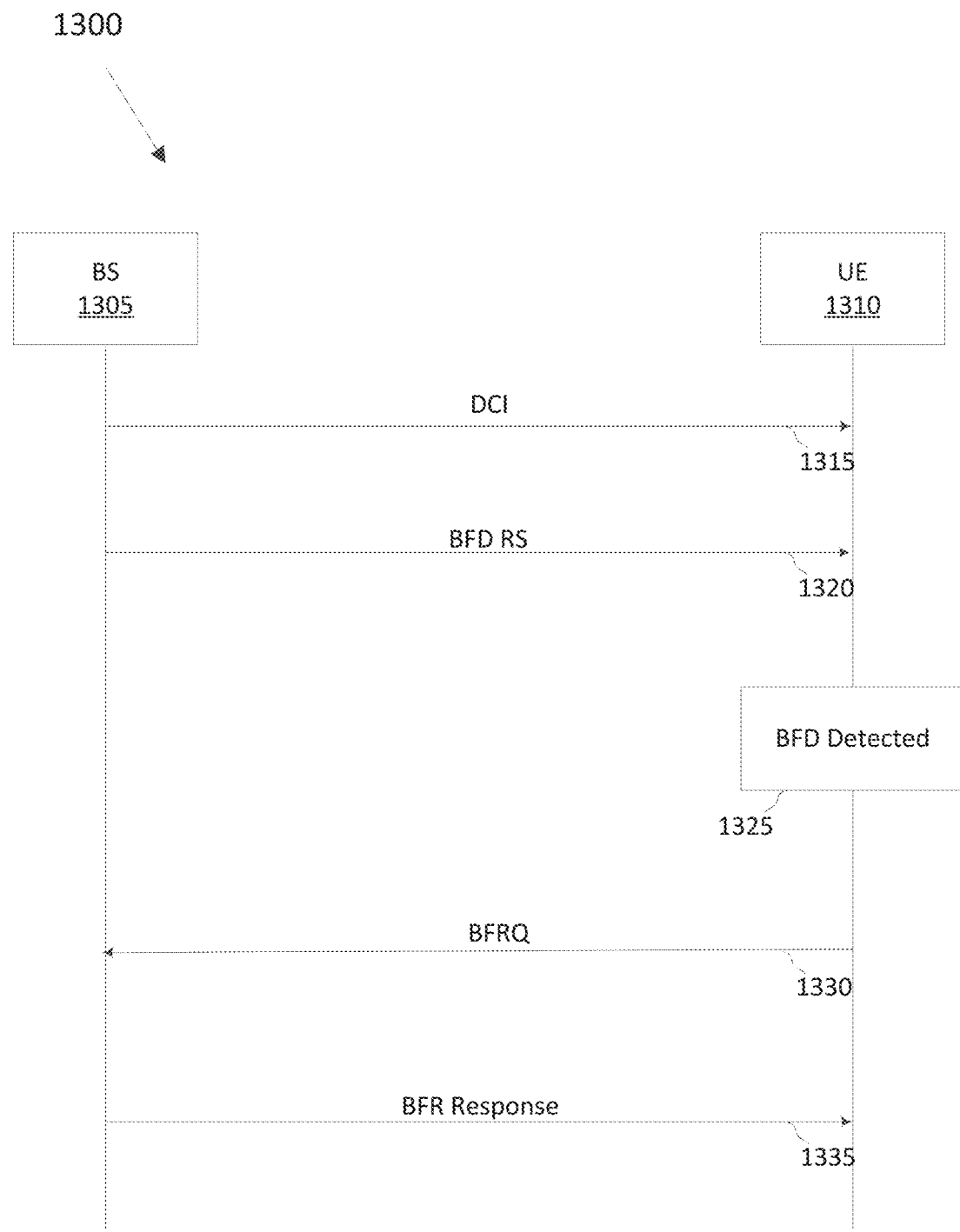
FIG. 13 shows a signaling diagram illustrating an example of a BFD RS determination according to some aspects of the present disclosure.

FIG. 13 shows a signaling diagram illustrating an example of a BFD RS determination according to some aspects of the present disclosure. In some examples, process flow 1300 may implement aspects of wireless communications system 100 or 200. In some aspects, process flow 1300 may be implemented by a UE 1310 and a BS 1305. In some aspects, BS 1305 can be but is not limited to BS 105, BS 215, BSs including PCell 342 and/or Scell 346, BSs including PCell 372 and/or Scell 376, or BS 500, which may utilize one or more components, such as the processor 502, the memory 504, the communications module 508, the BFR module 509, the transceiver 510, the modem 512, and the one or more antennas 516, to execute the steps of signaling process 1300. In some aspects, UE 1310 can be but is not limited to UE 115, UE 205, UE 310, UE 344, UE 374, or UE 400, which may utilize one or more components, such as the processor 402, the memory 404, the communications module 408, the BFD/BFR module 409, the transceiver 410, the modem 412, and the one or more antennas 416, to execute the steps of signaling diagram 1300. As illustrated, signaling process 600 includes a number of enumerated steps, but aspects of the signaling process 1300 may include additional steps before, after, and in between the enumerated steps. In some aspects, one or more of the enumerated steps may be omitted or performed in a different order.

In some examples, the operations illustrated in process flow 1300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At action 1315 of process flow 1300, in some aspects, the BS 1305 may transmit and the UE 1310 may receive at least one DCI communications. In some aspects, the at least one DCI communications may include multiple DCI communications, where each DCI communication of the multiple DCI communications includes a configuration information corresponding to a transmission reception point (TRP). In some instances, the at least one DCI communications may include an indication of beam failure detection (BFD) reference signals (RSs) for a group of beams of a serving cell having a group beam identifier. In some aspects, the group of beams of the serving cell may be associated with the TRP, and the group beam identifier may be a TRP identifier. In some aspects, the at least one DCI communications may include a single DCI communication including configuration information for the plurality of TRPs.

In some aspects, each DCI communication of the multiple DCI communications explicitly or implicitly indicates the BFD RSs for each TRP of the plurality of TRPs. For example, with respect to indicating explicitly, each of the multiple DCI communications may include a common radio link monitoring configuration element. As another example, each of the multiple DCI communications may include a radio link monitoring configuration element associated with a different TRP of the plurality of TRPs. With respect to indicating implicitly, in some aspects, the UE may determine one or more BFD RSs for each TRP of the plurality of TRPs, which may include, in some cases, determining the one or more BFD RSs for each TRP of the plurality of TRPs based on one or more transmission configuration index (TCI) states for one or more control resource sets (CORESETs) associated with the TRP.

In some aspects, the single DCI communication of the at least one DCI communications explicitly or implicitly indicates the BFD RSs for each TRP of the plurality of TRPs. In some aspects, when explicitly indicating, the single DCI communication may include configuration information including a radio link monitoring configuration element and an indication of the TRP. In some aspects, when implicitly indicating, the UE determine one or more BFD RSs for each TRP of the plurality of TRPs, including determining the one or more BFD RSs for each TRP of the plurality of TRPs based on an order index of transmission configuration index (TCI) states for one or more control resource sets (CORESETs) associated with the TRP.

At step 1320 action in some aspects, the BS 1305 may transmit and the UE 1310 may receive beam failure detection (BFD) reference signals (RSs) for a group of beams of a serving cell. In some aspects, the group of beams may be associated with a group beam identifier, which can be a TRP identifier.

At action 1325, in some aspects, the UE 1310 may determine that a BFD is detected. For example, the UE measure the reference signal received power (RSRP) of the received BFD RSs and determine that the RSRP is below a threshold for determining beam failure. For instance, the determination of beam failure may be based on a channel metric of the reference signal being below a threshold value (e.g., $Q_{out}$).

At action 1330, in some aspects, the UE 1310 may trigger a beam failure recovery (BFR) process for the group of beams, which may include, for example, transmitting a beam failure report to the BS indicating a BFD at the UE 1310. In some aspects, the BFR process may include transmitting, for instance, a RACH request to the BS 1305. In some cases, the UE 1310 may initiate random access procedures (e.g., contention-free random access) based on the random access resource (e.g., ra-preamble-index) associated with a selected reference signal index with RSRP above the threshold (e.g., RS index q_new). In some aspects, the BFR process may include transmitting, for instance, a link recovery request (LRR) to the BS 1305. In some cases, the LRR may indicate that the UE 1310 is requesting uplink resources (e.g., similar to a scheduling request (SR), and may use PUCCH format 0 or 1).

At action 1340, in some aspects, the BS 1305 may transmit and the UE 1310 may receive a BFR response. In some aspects, the BFR response may indicate a scheduling grant scheduling a new transmission.

Recitation of Various Aspects of the Present Disclosure

Aspect 1: A method of wireless communication performed by a user equipment (UE), the method comprising: monitoring for beam failure detection (BFD) reference signals (RSs) for a group of beams of a serving cell, the group of beams associated with a group beam identifier; measuring, based on the monitoring for the BFD RSs, a reference signal received power (RSRP) of one or more of the BFD RSs; and triggering, based on the RSRP being below a threshold, a beam failure recovery (BFR) process for the group of beams.

Aspect 2: The method of aspect 1, wherein the group of beams are associated with a transmission-reception point (TRP).

Aspect 3: The method of aspect 2, wherein the group beam identifier is a TRP identifier.

Aspect 4: The method of any of aspects 1-3, further comprising: receiving a plurality of downlink control information (DCI) communications, each of the plurality of DCI communications including a configuration corresponding to a TRP of a plurality of TRPs.

Aspect 5: The method of aspect 4, wherein the configuration of each of the plurality of DCI communications explicitly indicates the BFD RSs corresponding to the TRP of the plurality of TRPs.

Aspect 6: The method of aspect 5, wherein each of the plurality of DCI communications includes a radio link monitoring configuration element and a TRP identifier.

Aspect 7: The method of aspect 6, wherein each of the plurality of DCI communications includes a common radio link monitoring configuration element.

Aspect 8: The method of aspect 7, wherein the TRP identifier is associated with a control resource set (CORESET).

Aspect 9: The method of any of aspects 6-8, wherein each of the plurality of DCI communications includes a radio link monitoring configuration element associated with a different TRP of the plurality of TRPs.

Aspect 10: The method of any of aspects 4-9, wherein the configuration of each of the plurality of DCI communications implicitly indicates the BFD RSs corresponding to the TRP of the plurality of TRPs.

Aspect 11: The method of aspect 10, further comprising: determining one or more BFD RSs for each TRP of the plurality of TRPs; and wherein the monitoring for the BFD RSs for the group of beams comprises: monitoring, based on the determining, for the one or more BFD RSs for at least one TRP of the plurality of TRPs.

Aspect 12: The method of aspect 11, wherein the determining the one or more BFD RSs for each TRP of the plurality of TRPs comprises: determining the one or more BFD RSs for each TRP of the plurality of TRPs based on one or more transmission configuration index (TCI) states for one or more control resource sets (CORESETs) associated with the TRP.

Aspect 13: The method of aspect 12, wherein the determining the one or more BFD RSs for each TRP of the plurality of TRPs further comprises: determining the one or more BFD RSs for each TRP of the plurality of TRPs based on a first number TCI states for the one or more CORESETs associated with each TRP of the plurality of TRPs and a second number of TCI states across the plurality of TRPs, wherein the first number satisfies a first threshold and the second number satisfies a second threshold.

Aspect 14: The method of aspect 13, further comprising: receiving, from a base station, an indication of the first threshold and an indication of the second threshold.

Aspect 15: The method of aspect 13 or 14, further comprising: selecting the first number of TCI states for each TRP of the plurality of TRPs based on at least one of a TCI state ID, a CORESET ID, or a RS periodicity.

Aspect 16: The method of any of aspects 12-15, wherein the determining the one or more BFD RSs for each TRP of the plurality of TRPs further comprises: determining the one or more BFD RSs for each TRP of the plurality of TRPs based on quasi co-location (QCL)-type information associated with the one or more TCI states for the one or more CORESETs associated with the TRP.

Aspect 17: The method of aspect 16, wherein the determining the one or more BFD RSs for each TRP of the plurality of TRPs based on the QCL-type information comprises: prioritizing QCL-type D information over one or more of QCL-type A information, QCL-type B information, or QCL-type C information.

Aspect 18: The method of any of aspects 1-17, further comprising: receiving a single downlink control information (DCI) communication, the single DCI communication including configuration information for a plurality of TRPs.

Aspect 19: The method of aspect 18, wherein the configuration information explicitly indicates the BFD RSs for each TRP of the plurality of TRPs.

Aspect 20: The method of aspect 18 or 19, wherein the configuration information includes a radio link monitoring configuration element and an indication of a TRP.

Aspect 21: The method of aspect 20, wherein the configuration information includes a common radio link monitoring configuration element for the plurality of TRPs.

Aspect 22: The method of aspect 20 or 21, wherein the configuration information includes a radio link monitoring configuration element for each of the plurality of TRPs.

Aspect 23: The method of any of aspects 19-22, wherein the BFD RSs for each TRP of the plurality of TRPs are based on a physical cell identifier (PCI).

Aspect 24: The method of aspect 23, wherein the PCI is for the serving cell.

Aspect 25: The method of aspect 23, wherein the PCI is for a non-serving cell.

Aspect 26: The method of any of aspects 23-25, wherein the BFD RSs for each TRP of the plurality of TRPs are further based on at least one of a transmission configuration index (TCI) state or quasi co-location (QCL)-type information.

Aspect 27: The method of any of aspects 18-26, wherein the configuration information implicitly indicates the BFD RSs for each TRP of the plurality of TRPs.

Aspect 28: The method of aspect 27, further comprising: determining one or more BFD RSs for each TRP of the plurality of TRPs; and wherein the monitoring for the BFD RSs for the group of beams comprises: monitoring, based on the determining, for the one or more BFD RSs for at least one TRP of the plurality of TRPs.

Aspect 29: The method of aspect 28, wherein the determining the one or more BFD RSs for each TRP of the plurality of TRPs comprises: determining the one or more BFD RSs for each TRP of the plurality of TRPs based on an order index of transmission configuration index (TCI) states for one or more control resource sets (CORESETs) associated with the TRP.

Aspect 30: The method of aspect 29, wherein the determining the one or more BFD RSs for each TRP of the plurality of TRPs further comprises: determining the one or more BFD RSs for each TRP of the plurality of TRPs based on a first number TCI states for TCI states with a common order index, wherein the first number satisfies a first threshold.

Aspect 31: The method of aspect 30, wherein a total number of TCI states across all order indexes of the TCI states satisfies a second threshold.

Aspect 32: The method of any of aspects 28-31, wherein the determining the one or more BFD RSs for each TRP of the plurality of TRPs comprises: determining the one or more BFD RSs for each TRP of the plurality of TRPs based on transmission configuration index (TCI) state pairs associated with the TRP, wherein each TCI state in a TCI state pair is associated with a control resource set (CORESET).

Aspect 33: The method of aspect 32, wherein the determining the one or more BFD RSs for each TRP of the plurality of TRPs comprises: disregarding a TCI codepoint having only one TCI state.

Aspect 34: The method of any of aspects 28-33, wherein the configuration information indicates a transmission-reception point (TRP) identifier (ID) for a CORESET TCI state based on at least one of a CORESET ID or a TCI state ID.

Aspect 35: The method of aspect 34, wherein the determining the one or more BFD RSs for each TRP of the plurality of TRPs further comprises: determining one or more BFD RSs for each TRP ID based on up to a first number TCI states for one or more CORESETs associated with each TRP ID and a second number of TCI states across all TRP IDs, wherein the first number satisfies a first threshold and the second number satisfies a second threshold.

Aspect 36: The method of aspect 34 or 35, wherein a value of the CORESET ID indicates the TRP ID.

Aspect 37: The method of any of aspects 34-36, wherein a value of the TCI State ID indicates the TRP ID.

Aspect 38: The method of any of aspects 34-37, further comprising: receiving, from a base station, an indication that the TRP ID will be indicated by at least one of the CORESET ID or the TCI state ID.

Aspect 39: The method of aspect 38, further comprising: receiving, from the base station, at least one of: a mapping of CORESET ID values to TRP IDs; or a mapping of TCI state ID values to TRP IDs.

Aspect 40: The method of any of aspects 28-39, wherein each transmission configuration index (TCI) state for one or more control resource sets (CORESETs) associated with the TRP is associated with a TRP identifier (ID).

Aspect 41: The method of aspect 40, wherein the determining the one or more BFD RSs for each TRP of the plurality of TRPs further comprises: determining one or more BFD RSs for each TRP ID based on up to a first number TCI states for the one or more CORESETs associated with each TRP ID and a second number of TCI states across all TRP IDs, wherein the first number satisfies a first threshold and the second number satisfies a second threshold.

Aspect 42: The method of aspect 40 or 41, wherein the TRP ID is indicated based on a physical cell identifier (PCI) associated with each TCI state.

Aspect 43: The method of aspect 42, wherein the PCI is for the serving cell.

Aspect 44: The method of aspect 42, wherein the PCI is for a non-serving cell.

Aspect 45: The method of any of aspects 1-44, further comprising: receiving, from a base station, an indication whether transmission-reception point (TRP)-specific BFD is enabled; and wherein the monitoring for the BFD RSs is based on the indication whether TRP-specific BFD is enabled.

Aspect 46: The method of aspect 45, wherein the indication includes an explicit indication.

Aspect 47: The method of aspect 45 or 46, wherein the indication includes a flag associated with TRP-specific BFD.

Aspect 48: The method of aspect 45, wherein the indication includes an implicit indication.

Aspect 49: The method of aspect 48, wherein the implicit indication includes at least one of TRP-specific BFD medium access control (MAC) parameter.

Aspect 46: The method of aspect 49, wherein the TRP-specific BFD MAC parameter includes at least one of a counter or a timer.

Aspect 47: A user equipment (UE), comprising: a memory; a processor coupled to the memory; and a transceiver coupled to the processor, the UE configured to perform the methods of aspects 1-46.

Aspect 48: A user equipment (UE) comprising means for performing the methods of aspects 1-46.

Aspect 49: A non-transitory computer-readable medium (CRM) having program code recorded thereon, the program code comprising code for causing a user equipment (UE) to perform the methods of aspects 1-46.

Aspect 50: A method of wireless communication performed by a base station (BS), comprising: transmitting to a user equipment (UE) at least one DCI communications with an indication of beam failure detection (BFD) reference signals (RSs) for a group of beams of a serving cell; transmitting the BFD RSs to the UE; and receiving from the UE a beam failure recovery (BFR) message.

Aspect 51: The method of aspect 50, wherein each of the at least one DCI communications includes configuration information that corresponds to a transmission reception point (TRP) of a plurality of TRPs.

Aspect 52: The method of aspect 51, wherein the configuration information explicitly indicates the BFD RSs for the TRP of the plurality of TRPs.

Aspect 53: The method of aspect 51 or 52, wherein the at least one DCI communications includes transmission configuration information (TCI) states in one or more control resource sets (CORESETS) associated with the plurality of TRPs from which the BFD RSs can be determined.

Aspect 54: The method of aspect 53, wherein the at least one DCI communications include threshold values that the UE uses to determine the BFD RSs from the TCI states.

Aspect 55: The method of any of aspects 50-54, wherein the at least one DCI communications include a single downlink control information (DCI) communication with configuration information that corresponds to a plurality of TRPs.

Aspect 56: The method of aspect 55, wherein the single DCI communication includes an explicit assignment of the BFD RSs with a TRP of the plurality of TRPs.

Aspect 57: The method of aspect 55 or 56, wherein the single DCI communication includes configuration information where a TRP ID for the TRP is determined by a physical cell identifier (PCI).

Aspect 58: The method of any of aspects 55-57, wherein the single DCI communication includes TCI states of CORESETs associated with the plurality of TRPs, from which the BFD RSs can be determined.

Aspect 59: The method of aspect 58, wherein the CORESETs includes TCI pairs.

Aspect 60: The method of aspect 58 or 59, wherein either a CORESET ID is mapped to a TRP ID or a TCI state ID is mapped to a TRP ID.

Aspect 61: The method of aspect 60, wherein the indication includes a flag for determining whether the CORESET ID is mapped to the TRP ID or the TCI state ID is mapped to the TRP ID.

Aspect 62: The method of aspect 61, wherein the indication includes an identification of a split of the CORESET ID or the TCI state ID between different TRP IDs.

Aspect 63: The method of any of aspects 50-62, wherein the indication explicitly enables TRP specific BFD by the UE, and indicates that the BFD RSs are associated with TRPs in a plurality of TRPs.

Aspect 64: The method of any of aspects 50-63, wherein the indication implicitly enables TRP specific BFD by the UE by inclusion of one or more beam failure detection (BFD) parameters.

Aspect 65: The method of aspect 64, wherein the BFD parameters includes one or more of a BFI counter, a beam failure detection timer, or a BFD threshold value.

Aspect 66: A base station (BS), comprising: a memory; a processor coupled to the memory; and a transceiver coupled to the processor, the BS configured to perform the methods of aspects 50-65.

Aspect 67: A base station (BS) comprising means for performing the methods of aspects 50-65.

Aspect 68: A non-transitory computer-readable medium (CRM) having program code recorded thereon, the program code comprising code for causing a base station (BS) to perform the methods of aspects 50-65.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    receiving one or more downlink control information (DCI) communications, each of the one or more DCI communications including:
        a transmission reception point (TRP) identifier;
    receiving one or more configurations corresponding to a plurality of TRPs, wherein the one or more configurations comprises
        a plurality of radio link monitoring configuration elements, wherein each of the plurality of radio link monitoring configuration elements indicates, for a respective TRP of the plurality of TRPs, one or more second beam failure parameters;
    monitoring for beam failure detection (BFD) reference signals (RSs) for a group of beams of a serving cell, the group of beams associated with the plurality of TRPs;
    measuring, based on the monitoring for the BFD RSs, a reference signal received power (RSRP) of one or more of the BFD RSs; and
    triggering, based on the one or more configurations, and based on the RSRP being below a threshold, a beam failure recovery (BFR) process for the group of beams.

2. The method of claim 1, wherein the plurality of TRPs comprises a first TRP, and wherein the group of beams are associated with the first TRP.

3. The method of claim 1, wherein the receiving the one or more DCI communications comprises receiving a plurality of DCI communications, each of the plurality of DCI communications including a configuration corresponding to a TRP of a plurality of TRPs.

4. The method of claim 3, wherein the configuration of each of the plurality of DCI communications explicitly indicates the BFD RSs corresponding to the TRP of the plurality of TRPs.

5. The method of claim 4, wherein each of the plurality of DCI communications includes a radio link monitoring configuration element.

6. The method of claim 3, wherein the configuration of each of the plurality of DCI communications implicitly indicates one or more of the BFD RSs corresponding to the TRP of the plurality of TRPs.

7. The method of claim 6, wherein the monitoring for the BFD RSs for the group of beams comprises: monitoring for the one or more of the BFD RSs for the TRP of the plurality of TRPs.

8. The method of claim 7, wherein:
the one or more of the BFD RSs for the TRP of the plurality of TRPs are based on one or more transmission configuration index (TCI) states for one or more control resource sets (CORESETs) associated with the TRP.

9. The method of claim 1, wherein the receiving the one or more DCI communications comprises receiving a single DCI communication, the single DCI communication including configuration information for the plurality of TRPs.

10. The method of claim 9, wherein the configuration information explicitly indicates one or more of the BFD RSs corresponding to a TRP of the plurality of TRPs.

11. The method of claim 10, wherein the configuration information includes a radio link monitoring configuration element and an indication of the TRP.

12. The method of claim 11, wherein the configuration information includes a radio link monitoring configuration element for the TRP of the plurality of TRPs.

13. The method of claim 10, wherein the one or more of the BFD RSs corresponding to the TRP of the plurality of TRPs are based on a physical cell identifier (PCI).

14. The method of claim 9, wherein the configuration information implicitly indicates one or more of the BFD RSs corresponding to a TRP of the plurality of TRPs.

15. The method of claim 14, wherein the monitoring for the BFD RSs for the group of beams comprises: monitoring for the one or more of the BFD RSs for the TRP of the plurality of TRPs.

16. The method of claim 15, wherein the one or more of the BFD RSs for the TRP of the plurality of TRPs are based on an order index of transmission configuration index (TCI) states for one or more control resource sets (CORESETs) associated with the TRP.

17. The method of claim 16, wherein the one or more of the BFD RSs for the TRP of the plurality of TRPs are based on transmission configuration index (TCI) state pairs associated with the TRP, wherein each TCI state in a TCI state pair is associated with a control resource set (CORESET).

18. The method of claim 15, wherein the configuration information indicates a transmission-reception point (TRP) identifier (ID) for a CORESET TCI state based on at least one of a CORESET ID or a TCI state ID.

19. The method of claim 15, wherein each transmission configuration index (TCI) state for one or more control resource sets (CORESETs) associated with the TRP is associated with a TRP identifier (ID).

20. The method of claim 19, wherein the TRP ID is indicated based on a physical cell identifier (PCI) associated with each TCI state.

21. The method of claim 1, further comprising:
receiving, from a base station, an indication whether transmission-reception point (TRP)-specific BFD is enabled; and
wherein the monitoring for the BFD RSs is based on the indication whether TRP-specific BFD is enabled.

22. The method of claim 21, wherein the indication includes an explicit indication.

23. The method of claim 22, wherein the indication includes a flag associated with TRP-specific BFD.

24. The method of claim 21, wherein the indication includes an implicit indication.

25. The method of claim 24, wherein the implicit indication includes at least one of TRP-specific BFD medium access control (MAC) parameter.

26. The method of claim 1, wherein the TRP identifier comprises a CORESET pool index.

27. A user equipment (UE), comprising:
a memory; and
a processor coupled to the memory and configured to:
obtain one or more downlink control information (DCI) communications, each of the one or more DCI communications including:
a transmission reception point (TRP) identifier;
obtain one or more configurations corresponding to a plurality of TRPs, wherein the one or more configurations comprises
a plurality of radio link monitoring configuration elements, wherein each of the plurality of radio link monitoring configuration elements indicates, for a respective TRP of the plurality of TRPs, one or more second beam failure parameters;
monitor for beam failure detection (BFD) reference signals (RSs) for a group of beams of a serving cell, the group of beams associated with the plurality of TRPs;
measure, based on the monitoring for the BFD RSs, a reference signal received power (RSRP) of one or more of the BFD RSs; and
trigger, based on the one or more configurations, and based on the RSRP being below a threshold, a beam failure recovery (BFR) process for the group of beams.

28. A method of wireless communication performed by a base station (BS), comprising:
transmitting, to a user equipment (UE), at least one DCI communication with an indication of beam failure detection (BFD) reference signals (RSs) for a group of beams of a serving cell, the group of beams being associated with a plurality of transmission reception points (TRPs), and the at least one DCI communication including:
a TRP identifier;
transmitting one or more configurations corresponding to the plurality of TRPs, wherein the one or more configurations comprises
a plurality of radio link monitoring configuration elements, wherein each of the plurality of radio link monitoring elements indicates, for a respective TRP of the plurality of TRPs, one or more second beam failure parameters;
transmitting the BFD RSs to the UE; and
receiving from the UE a beam failure recovery (BFR) message.

29. A base station (BS), comprising:
a memory; and
a transceiver coupled to the memory and configured to:
   transmit, to a user equipment (UE), at least one DCI communication with an indication of beam failure detection (BFD) reference signals (RSs) for a group of beams of a serving cell, the group of beams being associated with a plurality of transmission reception points (TRPs), and the at least one DCI communication including:
      a TRP identifier;
   transmit one or more configurations corresponding to the plurality of TRPs, wherein the one or more configurations comprises
      a plurality of radio link monitoring configuration elements, wherein each of the plurality of radio link monitoring configurations elements indicates, for a respective TRP of the plurality of TRPs, one or more second beam failure parameters;
   transmit the BFD RSs to the UE; and
   receive from the UE a beam failure recovery (BFR) message.

* * * * *